US011553426B2

(12) United States Patent
Kim et al.

(10) Patent No.: US 11,553,426 B2
(45) Date of Patent: *Jan. 10, 2023

(54) METHOD FOR OPERATING COMMUNICATION NODE SUPPORTING LOW POWER MODE IN WIRELESS LAN

(71) Applicants: ELECTRONICS AND TELECOMMUNICATIONS RESEARCH INSTITUTE, Daejeon (KR); KOREA NATIONAL UNIVERSITY OF TRANSPORTATION INDUSTRY-ACADEMIC COOPERATION FOUNDATION, Chungju (KR)

(72) Inventors: Yong Ho Kim, Incheon (KR); Sung Hyun Hwang, Daejeon (KR); Igor Kim, Daejeon (KR); Seung Keun Park, Daejeon (KR)

(73) Assignees: Electronics and Telecommunications Research Institute, Daejeon (KR); Korea National University of Transportation Industry-Academic Cooperation Foundation, Chungju (KR)

(*) Notice: Subject to any disclaimer, the term of this patent is extended or adjusted under 35 U.S.C. 154(b) by 77 days.

This patent is subject to a terminal disclaimer.

(21) Appl. No.: 17/115,404

(22) Filed: Dec. 8, 2020

(65) Prior Publication Data

US 2021/0092678 A1 Mar. 25, 2021

Related U.S. Application Data

(63) Continuation of application No. 16/327,801, filed as application No. PCT/KR2017/009209 on Aug. 23, 2017, now Pat. No. 10,897,739.

(30) Foreign Application Priority Data

Aug. 23, 2016 (KR) .................. 10-2016-0107206
Feb. 2, 2017 (KR) .................. 10-2017-0014974
Mar. 10, 2017 (KR) .................. 10-2017-0030629

(51) Int. Cl.
*H04W 52/02* (2009.01)
*H04W 74/06* (2009.01)
(Continued)

(52) U.S. Cl.
CPC ....... *H04W 52/0229* (2013.01); *H04W 52/02* (2013.01); *H04W 74/00* (2013.01);
(Continued)

(58) Field of Classification Search
CPC .................. H04W 4/06; H04W 52/02; H04W 52/0203; H04W 52/0209; H04W 52/0229;
(Continued)

(56) References Cited

U.S. PATENT DOCUMENTS 6,047,378 A 4/2000 Garrett
9,485,733 B1 * 11/2016 Park .................. H04L 27/2613
(Continued)

OTHER PUBLICATIONS

Minyoung Park; LP-WUR; Low-Power Wake-Up Receiver Follow-Up; Mar. 14, 2016.
(Continued)

*Primary Examiner* — Frank Duong

(57) ABSTRACT

Disclosed is a method for operating a communication node supporting a low power mode in a wireless LAN. A method for operating a station, which includes a PCR and a WURx, comprises the steps of: allowing the WURx, which operates in a wake-up state, to receive a wake-up packet from an access point; transitioning an operating state of the PCR from a sleep state to the wake-up state when the wake-up packet is received; allowing the PCR, which operates in the
(Continued)

wake-up state, to receive a data frame from an access point; and allowing the PCR to transmit, to the access point, a response to the data frame.

20 Claims, 26 Drawing Sheets

(51) Int. Cl.
*H04W 84/12* (2009.01)
*H04W 74/08* (2009.01)
*H04W 74/00* (2009.01)

(52) U.S. Cl.
CPC ........... *H04W 74/06* (2013.01); *H04W 74/08* (2013.01); *H04W 84/12* (2013.01); *Y02D 30/70* (2020.08)

(58) Field of Classification Search
CPC ............. H04W 52/0235; H04W 74/00; H04W 74/002; H04W 74/06; H04W 74/08; H04W 74/0816; H04W 80/04; H04W 84/12; H04W 84/18; H04W 86/06; H04W 86/08; H04W 88/06; Y02D 30/70
See application file for complete search history.

(56) References Cited

U.S. PATENT DOCUMENTS

| | | | |
|---|---|---|---|
| 10,263,890 B2* | 4/2019 | Bannister | H04L 45/54 |
| 11,019,568 B2* | 5/2021 | Seok | H04W 76/28 |
| 2005/0215227 A1 | 9/2005 | Vu | |
| 2010/0220702 A1 | 9/2010 | Hiroyuki | |
| 2010/0241854 A1 | 9/2010 | Yao | |
| 2011/0134818 A1 | 6/2011 | Bae | |
| 2012/0250597 A1 | 10/2012 | Park | |
| 2013/0229963 A1 | 9/2013 | Asterjadhi | |
| 2014/0112225 A1 | 4/2014 | Jafarian | |
| 2014/0112229 A1 | 4/2014 | Merlin | |
| 2014/0269462 A1 | 9/2014 | Jia | |
| 2015/0172031 A1 | 6/2015 | Yeo | |
| 2016/0043855 A1 | 2/2016 | Seok | |
| 2016/0057703 A1 | 2/2016 | Benoit | |
| 2016/0242115 A1 | 8/2016 | Jafarian | |
| 2017/0332327 A1* | 11/2017 | Fang | H04W 52/0229 |
| 2018/0014316 A1* | 1/2018 | Guo | H04W 74/06 |
| 2018/0020405 A1* | 1/2018 | Huang | H04W 52/0229 |
| 2018/0041961 A1* | 2/2018 | Huang | H04W 52/0216 |
| 2019/0281551 A1* | 9/2019 | Kim | H04W 28/06 |

OTHER PUBLICATIONS

Frank Hsu; LP WUR Wake-Up Packet Indentity Considerations; Mar. 13, 2016.
Kim et al., "Considerations on WUR Design," IEEE 802.11-16/0950r0, 2016, pp. 1-12.
Park et al., "Performance Investigation on Wake-Up Receiver," IEEE 802.11-16/0865r1, 2016, pp. 1-16.
Son et al., "WUR-based Power Save Operations of AP," IEEE 802.11-16/0939r1, 2016, pp. 1-10.
Gor Kim et al., "Considerations on WUR Design", IEEE, Jul. 24, 2016.

* cited by examiner

METHOD FOR OPERATING COMMUNICATION NODE SUPPORTING LOW POWER MODE IN WIRELESS LAN

CROSS-REFERENCE TO RELATED APPLICATIONS

The present specification is a continuation of U.S. patent application Ser. No. 16/327,801 filed Feb. 22, 2019, which is a U.S. National Stage of International Patent Application No. PCT/KR2017/009209 filed Aug. 23, 2017, which claims priority to and the benefit of Korean Patent Application No. 10-2016-0107206 filed in the Korean Intellectual Property Office on Aug. 23, 2016, Korean Patent Application No. 10-2017-0014974 filed in the Korean Intellectual Property Office on Feb. 2, 2017, and Korean Patent Application No. 10-2017-0030629 filed in the Korean Intellectual Patent Office on Mar. 10, 2017, the entire contents of which are incorporated herein by reference.

TECHNICAL FIELD

The present invention relates to a wireless local area network (WLAN) technology, and more particularly, to a technology for supporting a communication node operating in a low-power mode in a WLAN.

BACKGROUND ART

With the development of information and communications technology, various wireless communication technologies are under development. Among these wireless communication technologies, a WLAN enables wireless connection to the Internet at a home or business, or in specific service provision areas using a portable terminal, such as a personal digital assistant (PDA), a laptop computer, and a portable multimedia player (PMP), based on radio frequency (RF) technology.

As standards for WLAN technology, the Institute of Electrical and Electronics Engineers (IEEE) 802.11 standards are under development. The IEEE 802.11a provides a transmission speed of 54 Mbps using an unlicensed band at 5 GHz. The IEEE 802.11b provides a transmission speed of 11 Mbps using direct sequence spread spectrum (DSSS) at 2.4 GHz. The IEEE 802.11g provides a transmission speed of 54 Mbps using orthogonal frequency division multiplexing (OFDM) at 2.4 GHz.

The WLAN technology according to the IEEE 802.11n standard operates in the 2.4 GHz band and the 5 GHz band based on an orthogonal frequency division multiplexing (OFDM) scheme, and when multiple input multiple output (MIMO)-OFDM is used, a transmission speed of up to 300 Mbps can be provided through four spatial streams. Also, the WLAN technology according to the IEEE 802.11n standard can support a channel bandwidth of up to 40 MHz and can provide a transmission speed of up to 600 Mbps in this case.

With the proliferation of such WLANs and the diversification of applications using WLANs, there is an increasing necessity for new WLAN technology for supporting a higher throughput than a data processing speed of IEEE 802.11n. Very high throughput (VHT) WLAN technology is one of the IEEE 802.11 WLAN technologies proposed to support a data processing speed of 1 Gbps or higher. Among these WLAN technologies, IEEE 802.11ac is being developed as a standard for providing VHT in a 5 GHz or lower band, and IEEE 802.11ad is being developed as a standard for providing VHT in a 60 GHz band. Also, the WLAN technology according to the IEEE 802.11ax standard aims at improving the frequency efficiency in a dense environment.

Since a communication node (e.g., access point (AP), station (STA), etc.) supporting the WLAN technology operates dependent on the battery, a low-power operation method will be needed to operate for a long time. In order to support the low-power operation, the communication node may include a receiver for the low-power operation, a transceiver for basic operations according to the IEEE 802.11, and the like. For example, in a period for waiting reception of a downlink signal, the receiver for the low-power operation may operate in a wake-up state and the transceiver for basic operations may operate in a sleep state.

However, a communication protocol between the receiver for the low-power operation and the transceiver for the basic operations, a communication protocol between the receiver for the low-power operation and another communication node (e.g., a transceiver for basic operations according to the IEEE 802.11 included in another communication node), a communication protocol between the transceiver for the basic operations and another communication node (e.g., a transceiver for basic operations according to the IEEE 802.11 included in another communication node), and the like are not clearly defined. Accordingly, communication performances may be degraded due to transmission and reception failures of frames in the WLAN.

Meanwhile, this description on the related arts is written for understanding of the background of the present disclosure. Thus, information on other than conventional technologies, which are already known to those skilled in this technology domain to which the technologies of the present disclosure belong, may be included in this description.

DISCLOSURE

Technical Problem

The present invention is directed to providing operation methods of a communication node supporting a low-power mode in a wireless LAN.

Technical Solution

In the operation method of a station according to a first embodiment of the present invention to achieve the above-described purpose, the station may comprise a primary connectivity radio (PCR) and a wake-up receiver (WURx), and the operation method may comprise transitioning an operation state of the PCR from a wake-up state to a sleep state; receiving, by the WURx, a wake-up packet from an access point; transitioning the operation state of the PCR from the sleep state to the wake-up state when the wake-up packet is received; receiving, by the PCR operating in the wake-up state, a data frame from the access point after a time required for transitioning the operation state of the PCR from the sleep state to the wake-up state; and transmitting, by the PCR, a response to the data frame to the access point.

Here, the operation method may further comprise after receiving the wake-up packet, transmitting, by the PCR operating in the wake-up state, a wake-up poll (WU-Poll) frame indicating completion of the transitioning to the wake-up state to the access point; and when the WU-Poll frame is not transmitted within the time required for transitioning from the sleep state to the wake-up state, receiving, by the PCR, the wake-up packet again from the access point.

Here, the operation method may further comprise after receiving the wake-up packet, receiving, by the PCR operating in the wake-up state, a trigger frame triggering transmission of at least one WU-Poll frame from the access point; and transmitting, by the PCR, a WU-Poll frame indicating completion of the transitioning to the wake-up state to the access point, through a channel indicated by the trigger frame, wherein the data frame is received after the transmission of the WU-Poll frame.

Here, the transitioning to the sleep state may comprise transmitting, by the PCR, a low-power operation request frame requesting approval of an operation of transitioning from the wake-up state to the sleep state to the access point; receiving, by the PCR, a low-power operation response frame approving the operation of transitioning, which is a response to the low-power operation request frame, from the access point; and when the low-power operation response frame is received, transitioning the operation state of the PCR from the wake-up state to the sleep state after transmitting the response.

Here, the station may operate in a wake-up radio (WUR) mode or a normal mode, the PCR may operate in the sleep state and the WURx may operate in the wake-up state in the WUR mode, and the PCR may operate in the wake-up state and the WURx may operate in the sleep state in the normal mode.

Here, the wake-up packet may include a legacy preamble and a WUR physical convergence layer protocol (PLCP) protocol data unit (PPDU), and the WUR PPDU may request the PCR to operate in the wake-up state.

Here, the WUR PPDU may include at least one of a Poll indicator indicating whether transmission of the WU-Poll frame is required, and a multi-user (MU) indicator indicating whether the wake-up packet is used for multi-user transmission.

Here, the legacy preamble may be received through a frequency band of 20 MHz, and the WUR PPDU may be received through a frequency band smaller than 20 MHz.

Here, the WUR PPDU may be duplicated in a frequency axis, multiplexed in the frequency axis, or extended for same information in the frequency axis.

In the operation method of a station according to a second embodiment of the present invention to achieve the above-described purpose, the access point may provide communication services to a station comprising a primary connectivity radio (PCR) and a wake-up receiver (WURx), and the operation method may comprise generating a wake-up packet requesting the PCR of the station to operate in a wake-up state when a data unit to be transmitted to the station is present; transmitting the wake-up packet to the WURx; and transmitting a data frame including the data unit to the PCR when the PCR is determined to operate in the wake-up state.

Here, when a response to the wake-up packet is required, the data frame may be transmitted when a wake-up poll (WU-Poll) frame indicating that the PCR has transitioned to the wake-up state is received from the station.

Here, the wake-up packet may include a legacy preamble and a WUR physical convergence layer protocol (PLCP) protocol data unit (PPDU), and the WUR PPDU may request the PCR to operate in the wake-up state.

Here, the WUR PPDU may include at least one of a Poll indicator indicating whether transmission of the WU-Poll frame is required, and a multi-user (MU) indicator indicating whether the wake-up packet is used for multi-user transmission.

Here, the legacy preamble may be transmitted through a frequency band of 20 MHz, and the WUR PPDU may be transmitted through a frequency band smaller than 20 MHz.

A station in a wireless LAN based communication system according to a third embodiment of the present invention to achieve the above-described purpose may comprise a processor, a primary connectivity radio (PCR) transmitting and receiving a legacy signal according to control of the processor, a wake-up receiver (WURx) receiving a wake-up packet according to control of the processor, and a memory storing at least one instruction executed by the processor. The at least one instruction may be configured to transition an operation state of the PCR from a wake-up state to a sleep state; receive, by the WURx, a wake-up packet from an access point; transition the operation state of the PCR from the sleep state to the wake-up state when the wake-up packet is received; receive, by the PCR operating in the wake-up state, a data frame from the access point after a time required for transitioning the operation state of the PCR from the sleep state to the wake-up state; and transmit, by the PCR, a response to the data frame to the access point.

Here, the at least one instruction may be further configured to after receiving the wake-up packet, transmit, by the PCR operating in the wake-up state, a wake-up poll (WU-Poll) frame indicating completion of the transitioning to the wake-up state to the access point; and when the WU-Poll frame is not transmitted within the time required for transitioning from the sleep state to the wake-up state, receive, by the PCR, the wake-up packet again from the access point.

Here, the at least one instruction may be further configured to after receiving the wake-up packet, receive, by the PCR operating in the wake-up state, a trigger frame triggering transmission of at least one WU-Poll frame from the access point; and transmit, by the PCR, a WU-Poll frame indicating completion of the transitioning to the wake-up state to the access point, through a channel indicated by the trigger frame, wherein the data frame is received after the transmission of the WU-Poll frame.

Here, the wake-up packet may include a legacy preamble and a WUR physical convergence layer protocol (PLCP) protocol data unit (PPDU), the WUR PPDU may request the PCR to operate in the wake-up state.

Here, the WUR PPDU may include at least one of a Poll indicator indicating whether transmission of the WU-Poll frame is required, and a multi-user (MU) indicator indicating whether the wake-up packet is used for multi-user transmission.

Here, the legacy preamble may be transmitted through a frequency band of 20 MHz, and the WUR PPDU may be transmitted through a frequency band smaller than 20 MHz.

Advantageous Effects

According to the present disclosure, in a WLAN based communication system, a communication node (e.g., AP or low-power STA) may comprise a primary connectivity radio (PCR) and a wake-up radio (WUR). The WUR may include at least one of a wake-up receiver (WURx) capable of receiving a wake-up packet and a wake-up transmitter (WUTx) capable of transmitting a wake-up packet. The low-power STA may operate in normal mode or WUR mode. In the normal mode, the PCR of the low-power STA may operate in a wake-up state, and the WUR of the low-power STA may operate in a sleep state. In the WUR mode, the PCR of the low-power STA may operate in a sleep state, and the WURx of the low-power STA may operate in a wake-up state.

In a data transmission and reception procedure between the AP and the low-power STA, the low-power STA may operate in the normal mode, and the low-power STA may operate in the WUR mode when the data transmission and reception procedure between the AP and the low-power STA is terminated. Here, the data transmission and reception procedure between the AP and the low-power STA may be performed to satisfy a latency requirement.

Meanwhile, in the WLAN based communication system, a wake-up packet that requests the low-power STA to operate in the normal mode can be used. The wake-up packet may include a legacy preamble and a WUR physical layer convergence protocol (PCLP) protocol data unit (PPDU), the WUR PPDU may be transmitted over a bandwidth less than 20 MHz (e.g., 4 MHz, 8 MHz, 16 MHz, etc.), and a dummy signal, data, and the like may be transmitted through a frequency band in which the WUR PPDU is not transmitted in the frequency band of 20 MHz. Alternatively, the WUR PPDU may be duplicated at the frequency band of 20 MHz. Alternatively, a plurality of WUR PPDUs may be multiplexed in the frequency band, or a WUR PPDU may be extended in the frequency band for the same information. Alternatively, WUR PPDUs for different low-power STAs can be transmitted in orthogonal frequency division multiplexing (OFDM) scheme in the frequency band of 20 MHz. Therefore, a communication node that cannot detect a narrow band signal can detect the wake-up packet (or the WUR PPDU included in the wake-up packet) for the low-power STA, so that a collision between the low-power STA and other communication nodes can be prevented.

Meanwhile, one wake-up packet may request one low-power STA or a plurality of low-power STAs to operate in the normal mode. When the wake-up packet requesting a plurality of low-power STAs to operate in the normal mode is received, the plurality of low-power STAs may delay transmission of a WU-Poll frame for reception of a trigger frame. When the trigger frame is received from the AP, each of the plurality of low-power STAs may transmit the WU-Poll frame through a resource indicated by the trigger frame. Thus, collisions between the WU-Poll frames can be prevented.

Meanwhile, the low-power STA can determine whether the low-power STA is located within the coverage of the AP based on the quality of the signal received from the AP. If it is determined that the low-power STA is located outside the coverage of the AP, the low-power STA may transmit a leave frame to the AP indicating that the low-power STA is located outside the coverage of the AP. The AP receiving the leave frame may not transmit a data frame to the low-power STA. Also, if it is determined that the low-power STA is located outside the coverage of the AP, the low-power STA can search for a communicable AP based on signals received from other APs, and perform communications by accessing a discovered AP. Therefore, the communication efficiency of the WLAN can be improved.

Meanwhile, each of the PCR and WUTx included in the AP can operate independently. For example, the WUTx of the AP may transmit a wake-up packet to the low-power STA, and the PCR of the AP may transmit a data frame to the low-power STA. When a response to the data frame is not received from the low-power STA, the PCR of the AP may perform a retransmission procedure of the data frame. Since the low-power STA operating in the WUR mode cannot receive the data frame, the low-power STA operating in the WUR mode cannot transmit the response to the data frame. In this case the channel may be occupied by unnecessary retransmission procedures for the data frame. In order to solve the problem described above, the RF transceiver of the AP can operate considering the operation of the WURx of the AP.

Figure 1:
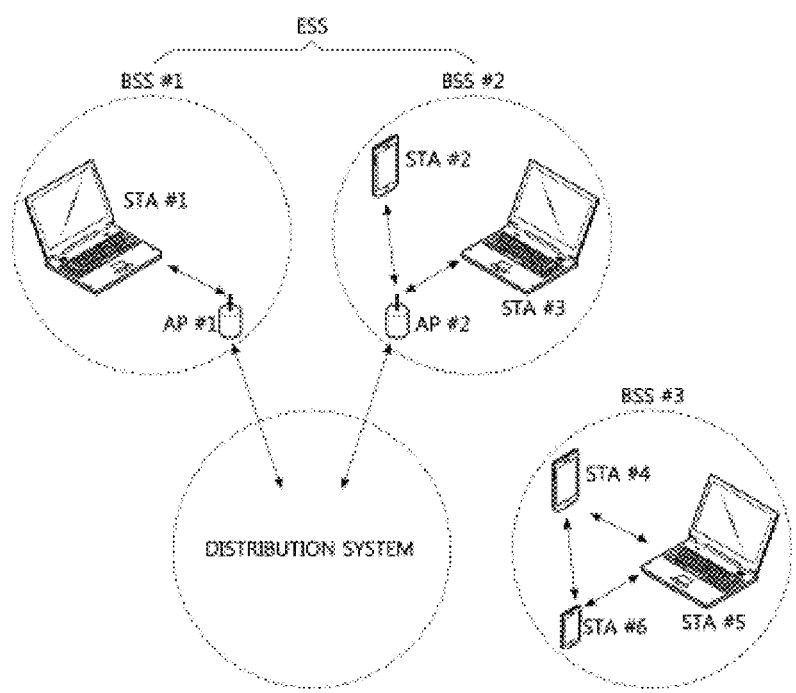
FIG. 1 is a conceptual diagram illustrating a first embodiment of a WLAN based communication system.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated.

Embodiments described in the present specification may be applied to a communication system (e.g., a wireless local area network (WLAN) based communication system) according to the Institute of Electrical and Electronics Engineers (IEEE) 802.11 standard. Also, the embodiments described in the present specification may be applied to other communication systems as well as the communication systems conforming to the IEEE 802.11 standard. For example, the embodiments described in the present specification may be applied to wireless personal area network (WPAN) based communication systems, wireless body area network (WBAN) based communication systems, 4G communication systems (e.g., long term evolution (LTE) based communication system, LTE-Advanced (LTE-A) based communication system), 5G communication system (e.g., new radio (NR) communication system), or the like.

In the WLAN-based communication system, a station (STA) may refer to a communication node performing functions of a medium access control (MAC) layer and functions of a physical layer on a wireless medium which are defined in the IEEE 802.11 standard. The STA may be classified into an access point (AP) STA and a non-AP STA. The AP STA may simply be referred to as an access point, and the non-AP STA may simply be referred to as a station. Also, the AP may be referred to as a base station (BS), a node B, an evolved node B, a relay, a radio remote head (RRH), a transmission and reception point (TRP), or the like. The station may be referred to as a terminal, a wireless transmit/receive unit (WTRU), a user equipment (UE), a device, or the like and may be a smart phone, a tablet PC, a laptop computer, a sensor device, or the like.

FIG. 1 is a conceptual diagram illustrating a first embodiment of a WLAN based communication system.

Referring to FIG. 1, a WLAN based communication system according to the IEEE 802.11 standard may include at least one basic service set (BSS). The BSS may indicate a set of communication nodes (e.g., APs #1-2, STAs #1-6, etc.). The BSS may be classified into an infrastructure BSS and an independent BSS (IBSS). Here, each of BSSs #1-2 may be an infrastructure BSS, and the BSS #3 may be an IBSS.

The BSS #1 may include a STA #1, an AP #1 connected to a distribution system, and the like. Also, the BSS #1 may further include the distribution system. The communications between the STA #1 and the AP #1 may be performed based on the IEEE 802.11 standard in the BSS #1. The BSS #2 may include a STA #2, a STA #3, an AP #2 connected to a distribution system, and the like. Also, the BSS #2 may further include the distribution system. The communications between the STA #2 and the AP #2, the communications between the STA #3 and the AP #2, and the like may be performed based on the IEEE 802.11 standard in the BSS #2. The communications between STAs (e.g., STAs #1-3) in the BSS #1 or BSS #2 may be performed through the AP (e.g., APs #1-2). However, when a direct link is established between STAs (e.g., STA #1-3), direct communications between the STAs (e.g., STA #1-3) may be performed.

The BSS #3 may be an IBSS operating in an ad-hoc mode. There may not be an AP which is an entity that performs a management function in the BSS #3. In the BSS #3, STAs (e.g., STAs #4-6) may be managed in a distributed manner. The STAs (e.g., STAs #4-6) may form a self-contained network since connections to the distribution system are not allowed in the BSS #3.

The plurality of BSSs (e.g., BSSs #1-2) may be interconnected via the distribution system. The plurality of BSSs connected through the distribution system may be referred to as an extended service set (ESS). The communication nodes (e.g., APs #1-2, STAs #1-3) included in the ESS may communicate with each other, and STAs (e.g., STA #1-3) belonging to the same ESS may move between BSSs (e.g., BSSs #1-2) while performing seamless communications.

The communication node (e.g., AP, STA, etc.) belonging to the WLAN based communication system may be configured as follows.

Figure 2:
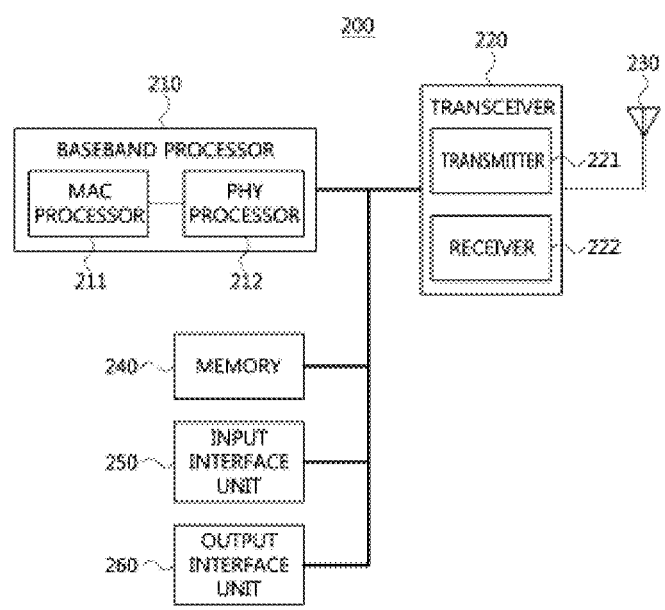
FIG. 2 is a block diagram illustrating a first embodiment of a communication node belonging to a WLAN based communication system.

FIG. 2 is a block diagram illustrating a first embodiment of a communication node belonging to a WLAN based communication system.

Referring to FIG. 2, a communication node 200 may include a baseband processor 210, a transceiver 220, an antenna 230, a memory 240, an input interface unit 250, an output interface unit 260, and the like. The baseband processor 210 may perform baseband-related signal processing, and may include a MAC processor 211 and a PHY processor 212. The MAC processor 211 may perform functions of the MAC layer defined in the IEEE 802.11 standard and the PHY processor 212 may perform functions of the PHY layer defined in the IEEE 802.11 standard.

The transceiver 220 may include a transmitter 221 and a receiver 222. The antenna 230 may be configured as an antenna array to support multiple-input multiple-output (MIMO). The memory 240 may store instructions executed by the baseband processor 210 and may comprise at least one of a read only memory (ROM) and a random access memory (RAM). The input interface unit 250 may obtain information from a user of the communication node 200 and the output interface unit 260 may provide information to the user of the communication node 200. The baseband processor 210, the transceiver 220, the memory 240, the input interface unit 250 and the output interface unit 260 may be connected to each other via a bus.

Meanwhile, the communication node (e.g., AP, STA, etc.) belonging to the WLAN based communication system may perform transmission and reception of a frame based on a point coordination function (PCF), a hybrid coordination function (HCF), a HCF controlled channel access (HCCA) function, an enhanced distributed channel access (EDCA) function, or the like.

In the WLAN based communication system, a frame may be classified into a management frame, a control frame, and a data frame. The management frame may include an association request frame, an association response frame, a reassociation request frame, a reassociation response frame, a probe request frame, a probe response frame, a beacon frame, a disassociation frame, an authentication frame, a deauthentication frame, an action frame, and the like.

The control frame may include an acknowledgment (ACK) frame, a block ACK request (BAR) frame, a block ACK (BA) frame, a power saving (PS)-Poll frame, a request to send (RTS) frame, a clear to send (CTS) frame, and the like. The data frame may be classified into a quality of service (QoS) data frame and a non-QoS data frame. The QoS data frame may indicate a data frame requiring transmission according to the QoS, and the non-QoS data frame may indicate a data frame not requiring transmission according to the QoS.

Figure 3:
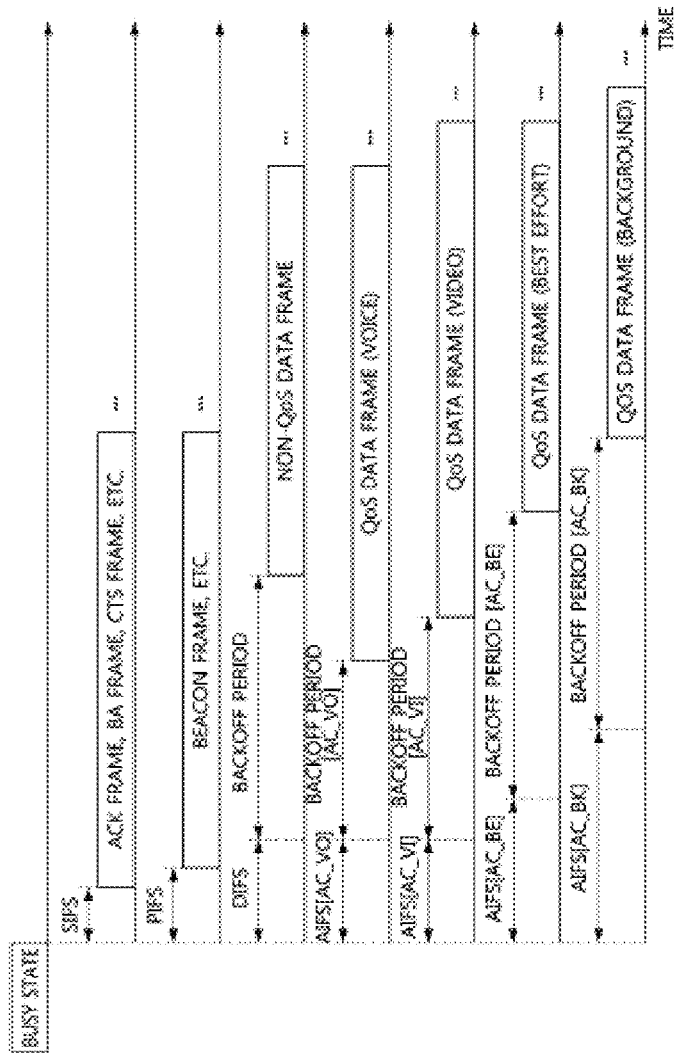
FIG. 3 is a timing diagram illustrating a first embodiment of an operation method of a communication node based on EDCA.

FIG. 3 is a timing diagram illustrating a first embodiment of an operation method of a communication node based on EDCA.

Referring to FIG. 3, a communication node desiring to transmit a control frame (or a management frame) may perform a channel state monitoring operation (e.g., carrier sensing operation) during a predetermined period (e.g., short interframe space (SIFS) or PCF IFS (PIFS)), and when the channel state is determined to be idle during the predetermined period (e.g., SIFS or PIFS), the communication node may transmit the control frame (or the management frame). For example, the communication node may transmit an ACK frame, a BA frame, a CTS frame, or the like when the channel state is determined to be idle during SIFS. Also, the communication node may transmit a beacon frame or the like when the channel state is determined to be idle during the PIFS. On the other hand, when it is determined that the channel state is busy during the predetermined period (e.g., SIFS or PIFS), the communication node may not transmit the control frame (or the management frame). Here, the carrier sensing operation may refer to a clear channel assessment (CCA) operation.

A communication node desiring to transmit a non-QoS data frame may perform a channel state monitoring operation (e.g., carrier sensing operation) during DCF IFS (DIFS), and when the channel state is determined to be idle during the DIFS, the communication node may perform a random backoff procedure. For example, the communication node may select a backoff value (e.g., a backoff counter) within a contention window according to the random backoff procedure and may perform a channel state monitoring operation (e.g., carrier sensing operation) during a period corresponding to the selected backoff value (hereinafter, referred to as 'backoff period'). The communication node may transmit the non-QoS data frame when the channel state is determined to be idle during the backoff period.

A communication node desiring to transmit a QoS data frame may perform a channel state monitoring operation (e.g., carrier sensing operation) during an arbitration IFS (AIFS), and when the channel state is determined to be idle during the AIFS, the communication node may perform a random backoff procedure. The AIFS may be configured according to an access category (AC) of a data unit (e.g., protocol data unit (PDU)) included in the QoS data frame. The AC of the data unit may be as shown in Table 1 below.

TABLE 1

| Priority | AC | Description |
|---|---|---|
| Lowest | AC_BK | Background |
|  | AC_BE | Best effort |
|  | AC_VI | Video |
| Highest | AC_VO | Voice |

AC_BK may indicate background data, AC_BE may indicate data transmitted in the best effort manner, AC_VI may indicate video data, AC_VO may indicate voice data. For example, the length of the AIFS for the QoS data frame corresponding to each of AC_VO and AC_VI may be configured to be equal to the length of the DIFS. The length of the AIFS for the QoS data frame corresponding to each of AC_BE and AC_BK may be configured to be longer than the length of the DIFS. Here, the length of the AIFS for the QoS data frame corresponding to AC_BK may be configured to be longer than the length of the AIFS for the QoS data frame corresponding to AC_BE.

In the random backoff procedure, the communication node may select a backoff value (e.g., a backoff counter) within a contention window according to the AC of the QoS data frame. The contention window according to the AC may be as shown in Table 2 below. $CW_{min}$ may indicate a minimum value of the contention window, $CW_{max}$ may indicate a maximum value of the contention window, and each of the minimum value and the maximum value of the contention window may be represented by the number of slots.

TABLE 2

| AC | $CW_{min}$ | $CW_{max}$ |
|---|---|---|
| AC_BK | 31 | 1023 |
| AC_BE | 31 | 1023 |
| AC_VI | 15 | 31 |
| AC_VO | 7 | 15 |

The communication node may perform a channel state monitoring operation (e.g., carrier sensing operation) during the backoff period and may transmit the QoS data frame when the channel state is determined to be idle during the backoff period.

Figure 4:
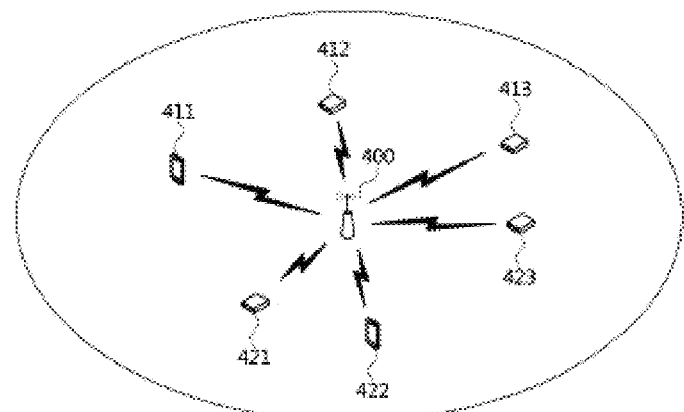
FIG. 4 is a conceptual diagram illustrating a second embodiment of a WLAN based communication system.

FIG. 4 is a conceptual diagram illustrating a second embodiment of a WLAN based communication system.

Referring to FIG. 4, a WLAN based communication system may include an AP 400, STAs supporting a low-power operation (hereinafter referred to as low-power STA') 411, 412 and 413, STAs 421, 422 and 423 which do not support a wake-up radio (WUR) mode (hereinafter referred to as 'legacy STA'), and the like. The low-power STAs 411, 412 and 413 and the legacy STAs 421, 422 and 423 may belong to coverage of the AP 400, and the AP 400 may provide communication services to the low-power STAs 411, 412 and 413 and the legacy STAs 421, 422 and 423. The low-power STA #1 411 and the legacy STA #2 422 may be smart phones, and the low-power STA #2 412, the low-power STA #3 413, the legacy STA #1 421, and the legacy STA #3 423 may be sensor devices.

The AP 400 may support communication protocols used by the low-power STAs 411, 412, and 413 and the legacy STAs 421, 422, and 423, respectively. The low-power STAs 411, 412, and 413 may use communication protocols defined in the IEEE 802.11ba standard. Also, the low-power STAs 411, 412, and 413 may use communication protocols defined in other standards such as IEEE 802.11a/b/g/n/p/ac/ax/ad/ay, etc. as well as the communication protocol defined in the IEEE 802.11ba standard. The legacy STAs 421, 422 and 423 may use the communication protocols defined in standards (e.g., IEEE 802.11a/b/g/n/p/ac/ax/ay, etc.) other than IEEE 802.11ba standard.

The legacy STAs 421, 422 and 423 may be configured the same or similar to the communication node 200 shown in FIG. 2, and the low-power STAs 411, 412 and 413 may be configured as follows.

Figure 5:
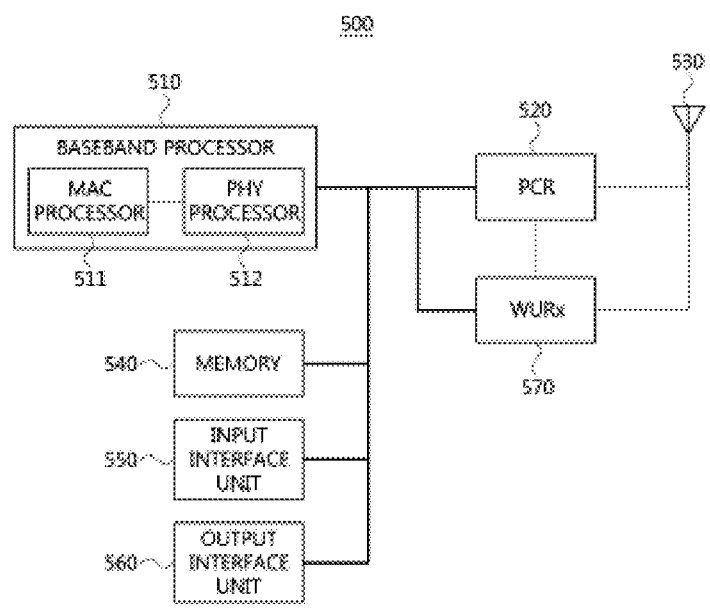
FIG. 5 is a block diagram illustrating a first embodiment of a low-power station in a WLAN based communication system.

FIG. 5 is a block diagram illustrating a first embodiment of a low-power station in a WLAN based communication system.

Referring to FIG. 5, a low-power STA 500 may include a baseband processor 510, a primary connectivity radio (PCR) 520, an antenna 530, a memory 540, an input interface unit 550, an output interface unit 560, a wake-up receiver (WURx) 570, and the like. For example, the low-power STA 500 may further include the WURx 570 as compared to the communication node 200 of FIG. 2. The functions of each of the baseband processor 510, the PCR 520, the antenna 530, the memory 540, the input interface unit 550, and the output interface unit 560 included in the low-power STA 500 may be are the same as or similar to the functions of each of the baseband processor 210, the RF transceiver 220, the antenna 230, the memory 240, the input interface unit 250, and the output interface unit 260 included in the communication node 200 of FIG. 2.

The WURx 570 may be located in the PCR 520 or may be configured independently of the PCR 520. The WURx 570 and the PCR 520 may share the same antenna 530. Alternatively, the antenna for the WURx 570 may be configured separately from the antenna for the PCR 520. For example, the low-power STA 500 may include a first antenna (not shown) for the WURx 570 and a second antenna (not shown) for the PCR 520. The communications between the WURx 570 and the PCR 520 may be performed using a primitive signal, a signal according to an application protocol interface (API), or the like.

The WURx 570 may operate in a narrow band (e.g., 4 MHz, 8 MHz, 16 MHz, etc.) and the power consumption of the low-power STA 500 including the WURx 570 may be less than 1 mW. The WURx 570 may receive an on-off keying (OOK) modulated signal (e.g., a wake-up packet) and perform demodulation on the received signal to verify information included in the received signal. The PCR 520 may transmit and receive frames (e.g., control frames, management frames, data frames) defined in the IEEE 802.11 standard and may operate in at least one of the 2.4 GHz frequency band and the 5 GHz frequency band. Also, the PCR 520 may support 20 MHz bandwidth, 40 MHz bandwidth, 80 MHz bandwidth, 160 MHz bandwidth, or the like.

Each of the PCR 520 and the WURx 570 may operate in a wake-up state or a sleep state. The wake-up state may indicate a state in which power is supplied to the corresponding entity (e.g., PCR 520 or WURx 570), and may be referred to as "on state, "activation state", "enable state", "awake state", or the like. The sleep state may indicate a state in which no power or a minimum power is supplied to the corresponding entity (e.g., PCR 520 or WURx 570), and may be referred to as "off state", "deactivation state", "disable state", "doze state", or the like.

The low-power STA 500 may support two modes as shown in Table 3 below.

TABLE 3

| | PCR | WURx |
|---|---|---|
| Normal mode | Wake-up state | Sleep state |
| WUR mode | Sleep state | Wake-up state |

In the normal mode, the PCR 520 of the low-power STA 500 may operate in the wake-up state and the WURx 570 of the low-power STA 500 may operate in the sleep state. For example, the PCR 520 operating in the wake-up state may perform transmission and reception procedures of a frame (e.g., a legacy frame, a legacy signal) with another communication node. In the WUR mode, the PCR 520 of the low-power STA 500 may operate in the sleep state and the WURx 570 of the low-power STA 500 may operate in the wake-up state. For example, the WURx 570 operating in the wake-up state may perform a channel state monitoring operation (e.g., carrier sensing operation) to receive a wakeup packet. Here, the wake-up packet may request the low-power STA 500 to operate in the normal mode.

When the wake-up packet is received from another communication node, the WURx 570 may transmit to the PCR 520 a wake-up indicator requesting the PCR 520 to operate in the wake-up state. When the wake-up indicator is received from the WURx 570, the operation state of the PCR 520 may transition from the sleep state to the wake-up state. When the wake-up indicator is transmitted to the PCR 520 or when the operation state of the PCR 520 transitions from the sleep state to the wake-up state, the operation state of the WURx 570 may transition from the wake-up state to the sleep state. Alternatively, the operation state of the WURx 570 may transition from the wake-up state to the sleep state when a sleep indicator requesting the WURx 570 to operate in the sleep state is received from the PCR 520. Here, a time required for the transition from the WUR mode to the normal mode may be referred to as 'mode transition time'. For example, the mode transition time may indicate a time from the reception of the wake-up packet to a time when the low-power STA starts to operate in the normal mode.

When the operation of frame transmission and reception is completed, the operation state of the PCR 520 may transition from the wake-up state to the sleep state. In this case, the PCR 520 may transmit to the WURx 570 a wake-up indicator requesting the WURx 570 to operate in the wake-up state. When the wake-up indicator is received from the PCR 520, the operation state of the WURx 570 may transition from the sleep state to the wake-up state. When the wake-up indicator is transmitted to the WURx 570 or when the operation state of the WURx 570 transitions from the sleep state to the wake-up state, the operation state of the PCR 520 may transition from the wake-up state to the sleep state.

Also, the baseband processor 510 (e.g., a MAC processor 511 included in the baseband processor 510) may operate in the wake-up state or the sleep state based on the operation state of the PCR 520. For example, the baseband processor 510 (e.g., the MAC processor 511) may also operate in the wake-up state when the PCR 520 operates in the wake-up state, and the baseband processor 510 (e.g., the MAC processor 511) may also operate in the sleep state when the PCR 520 operates in the sleep state. For example, when a wake-up indicator requesting to operate in the wake-up state is received from the PCR 520 operating in the wake-up state, the operation state of the baseband processor 510 (e.g., MAC processor 511) may transition from the sleep state to the wake-up state. When a sleep indicator requesting to operate in the sleep state is received from the PCR 520 to operate in the sleep state, the operation state of the baseband processor 510 (e.g., MAC processor 511) may transition from the wake-up state to the sleep state. Alternatively, the baseband processor 510 may always operate in the wake-up state regardless of the operation state of the PCR 520.

Meanwhile, an AP supporting low-power operations may be configured the same or similar to the low-power STA 500 described above. For example, the AP may include the baseband processor 510, the PCR 520, the antenna 530, the memory 540, the input interface unit 550, the output interface unit 560, the WURx 570, and the like. Also, the AP may include a wake-up transmitter (WUTx) (not shown) instead of the WURx 570, or may include a wake up radio (WUR) that performs the functions of WURx 570 and the WUTx. The WUTx may perform operations corresponding to the WURx 570. For example, WUTx may operate in a narrow band (e.g., 4 MHz, 8 MHz, 16 MHz, etc.). The WUTx may transmit an OOK modulated signal (e.g., the wake-up packet). Also, the low-power STA 500 may further include a WUTx corresponding to the WURx 570.

Meanwhile, in the WLAN based communication system, a frequency band supported by the PCR of the communication node (e.g., AP, STA) may be 10 MHz, 20 MHz, 40 MHz, 80 MHz, 160 MHz, or the like according to the IEEE 802.11 standard (e.g., IEEE 802.11a/b/g/n/p/ac/ad/ax/ay). Also, in the frequency band supported by the PCR, one channel (CH) may include a plurality of subchannels (SUB-CHs). Here, the number of subchannels and the bandwidth of each subchannel may differ depending on the IEEE 802.11 standard (e.g., IEEE 802.11a/b/g/n/p/ac/ad/ax/ay).

For example, in the WLAN based communication system supporting the IEEE 802.11ax standard, a channel having a bandwidth of 20 MHz may include up to 9 subchannels according to the size of a resource unit (RU) allocated to a subchannel.

In a WLAN based low-power communication system, a channel may be configured as follows.

Figure 6:
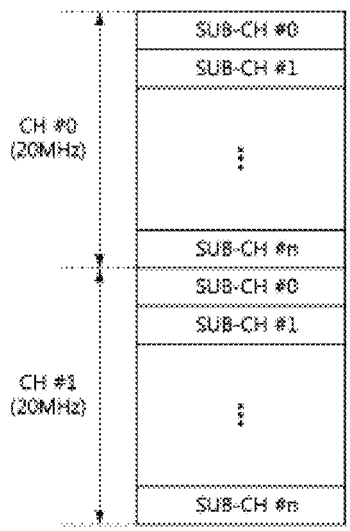
FIG. 6 is a conceptual diagram illustrating a first embodiment of a channel configuration in a WLAN based low-power communication system.

FIG. 6 is a conceptual diagram illustrating a first embodiment of a channel configuration in a WLAN based low-power communication system.

Referring to FIG. 6, a WUR of a communication node (e.g., AP, low-power STA) may support a frequency band of 20 MHz or a frequency band smaller than 20 MHz (e.g., 4 MHz, 8 MHz, 16 MHz, etc.). Also, a channel used by the WUR may comprise a plurality of subchannels, and a bandwidth of each of the plurality of subchannels may be less than the bandwidth supported by the PCR. For example, the 40 MHz frequency band may be comprised of a channel #0 and a channel #1, and when the bandwidth of the subchannel is 4 MHz, each of the channel #0 and the channel #1 may comprise three or four subchannels. Here, a guard band (GB) for protecting each subchannel may be located between the subchannels.

Hereinafter, operation methods of communication nodes (e.g., AP, STA, etc.) supporting low-power operations in a WLAN based communication system will be described. Even when a method (e.g., transmission or reception of a frame) performed at a first communication node among the communication nodes is described, a corresponding second communication node may perform a method (e.g., reception or transmission of the frame) corresponding to the method performed at the first communication node. That is, when an operation of the STA is described, the corresponding AP may perform an operation corresponding to the operation of the STA. Conversely, when an operation of the AP is described, the corresponding STA may perform an operation corresponding to the operation of the AP.

Also, a transmission start time point and a transmission end time point of a signal (e.g., frame) in a transmitting communication node may be assumed to be the same as a reception start time point and a reception end time point of the corresponding signal (e.g., corresponding frame) in a receiving communication node. A start time point of a signal (e.g., frame) may indicate a transmission start time point or a reception start time point, and an end time point of a signal (e.g., frame) may indicate a transmission end time point or a reception end time point.

Access Procedure Between AP and Low-Power STA

The access procedure between the AP and the low-power STA may be performed in the same or similar manner as the access procedure between the AP and the legacy STA. For example, the access procedure may include a discovery procedure (or a scanning procedure), an authentication procedure, and an association procedure. In the discovery procedure, the low-power STA may transmit a probe request frame, receive a probe response frame from the AP in response to the probe request frame, and identify information included in the probe response frame. Alternatively, the low-power STA may receive a beacon frame from the AP and may identify information included in the beacon frame. In the discovery procedure, the low-power STA may select at least one AP based on the information included in the probe response frame or the beacon frame.

Then, the low-power STA may perform the authentication procedure with at least one AP selected in the discovery procedure. For example, the low-power STA may transmit an authentication request frame to the AP and may receive an authentication response frame from the AP in response to the authentication request frame. Then, the low-power STA may perform the association procedure with one AP that has been authenticated. For example, the low-power STA may transmit an association request frame to the AP and may receive an association response frame from the AP in response to the association request frame. When the association procedure between the AP and the low-power STA is completed, the access procedure between the AP and the low-power STA may be terminated.

Procedure for Requesting Support of Low-Power Operation

After the access procedure between the AP and the low-power STA is completed, the low-power STA may request the AP to support the low-power operation. A procedure for requesting support of the low-power operation may be performed as follows.

Figure 7:
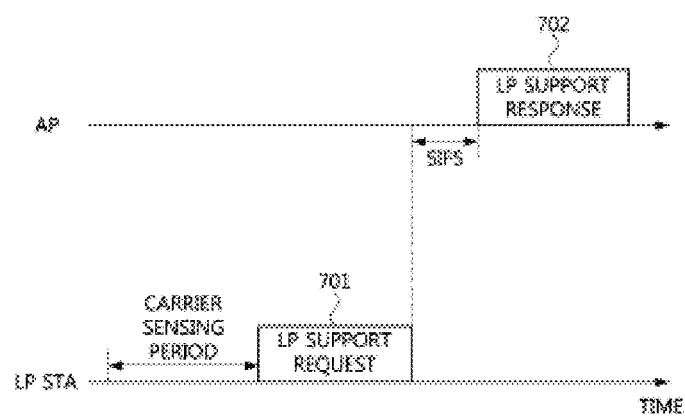
FIG. 7 is a timing chart illustrating a first embodiment of an operation method of a communication node in a WLAN based communication system.

FIG. 7 is a timing chart illustrating a first embodiment of an operation method of a communication node in a WLAN based communication system.

Referring to FIG. 7, a WLAN based communication system may include an AP, a low-power STA, and the like. The low-power STA may belong to coverage of the AP and may access the AP. The AP and the low-power STA may operate based on the EDCA scheme shown in FIG. 3. The AP and the low-power STA may be the same as or similar to the low-power STA 500 of FIG. 5. Also, the AP and the low-power STA may further include a WUTx as compared to the low-power STA 500 of FIG. 5.

After the access procedure between the AP and the low-power STA is completed, the low-power STA may generate a low-power (LP) support request frame 701 requesting the AP to support the low-power operation. The LP support request frame may be configured to be the same as or similar to the action frame defined in the IEEE 802.11 standard. The LP support request frame 701 may include at least one of information elements described in Table 4 below.

TABLE 4

| Information Element | Description |
| --- | --- |
| Address | MAC address, identifier (ID), association ID (ID), partial AID (PAID) |
| LP request indicator | Requests support of low-power operation |
| Mode transition time | Time required for transition from low-power mode to normal mode |
| Candidate resource information | Channel, subchannel, RU |

The address may indicate a MAC address, an ID, an AID, a PAID, etc. of the low-power STA. The LP request indicator may have a size of 1 bit. For example, an LP request indicator set to '1' may request support of the low-power operation. The candidate resource information may indicate candidate resources (e.g., channel, subchannel, RU, etc.) to be used in the data transmission and reception procedure between the AP and the low-power STA. Also, the LP support request frame 701 may further include capability information of the low-power STA.

The low-power STA (e.g., the PCR in the low-power STA) may perform a carrier sensing operation in a carrier sensing period, and transmit the LP support request frame 701 to the AP when the channel state is determined to be idle during the carrier sensing period. The carrier sensing period may be SIFS, PIFS, 'DIFS+backoff period', 'AIFS [AC_VO]+backoff [AC_VO] period', 'AIFS [AC_VI]+backoff [AC_VI] period', 'AIFS [AC_BE]+backoff [AC_BE] period' or 'AIFS [AC_BK]+backoff [AC_BK] period' as shown in FIG. 3.

The AP may receive the LP support request frame 701 from the low-power STA and may identify the information elements included in the LP support request frame 701. For example, the AP may confirm that the support of the low-power operation is requested based on the LP support request frame 701, and may determine whether to support the low-power operation. When it is determined to support the low-power operation for the low-power STA, the AP may allocate resources for the low-power STA based on the candidate resource information included in the LP support request frame 701. For example, the AP may allocate the resources indicated by the candidate resource information of the LP support request frame 701 as resources for the low-power STA. Alternatively, the AP may allocate resources other than the resources indicated by the candidate resource information of the LP support request frame 701 as resources for the low-power STA.

The AP may generate an LP support response frame 702 that includes at least one of information elements listed in Table 5 below.

TABLE 5

| Information Element | Description |
| --- | --- |
| LP approval indicator | Indicates approval of support of low-power operation |
| Allocated resource information | Channel, subchannel, RU |

The LP approval indicator may have a size of 1 bit. For example, an LP approval indicator set to '1' may indicate that support for the low-power operation is approved. The allocated resource information may indicate resources allocated based on the candidate resource information included in the LP support request frame 701. The resources indicated by the allocated resource information may be used for transmission and reception procedures between the AP and the low-power STA.

The AP may transmit the LP support response frame 702 to the low-power STA after a SIFS from the reception end time point of the LP support request frame 701. The low-power STA may receive the LP support response frame 702 from the AP and identify the information elements included in the LP support response frame 702. For example, the low-power STA may determine that the support of the low-power operation is approved based on the LP support response frame 702, and may operate in the WUR mode or the normal mode after the end of the reception of the LP support response frame 702. That is, the low-power STA may operate only in the normal mode before the support of the low-power operation is approved, and may operate in the WUR mode or the normal mode after the support of the low-power operation is approved.

Meanwhile, the procedure for requesting support of low-power operation described above may be performed in the association procedure between the AP and the low-power STA. In this case, the low-power STA may transmit an association request frame containing at least one information element described in Table 4 to the AP. The AP may receive the association request frame from the low-power STA and may determine whether to support the low-power operation based on the information elements included in the association request frame. When the support of the low-power operation is approved, the AP may generate an association response frame indicating that the support of the low-power operation is approved, and may transmit the association response frame to the low-power STA. Here, the association response frame may include at least one information element described in Table 5. The low-power STA may receive the association response frame from the AP and may identify the information elements included in the association response frame. When it is determined that the support of the low-power operation is approved based on the association response frame, the low-power STA may operate in the WUR mode or the normal mode after the reception end time point of the association response frame.

Format of Wake-Up Packet

In a WLAN based communication system, a wake-up packet may be used to wake up a low-power STA operating in the WUR mode. The wake-up packet may be configured as follows.

Figure 8:
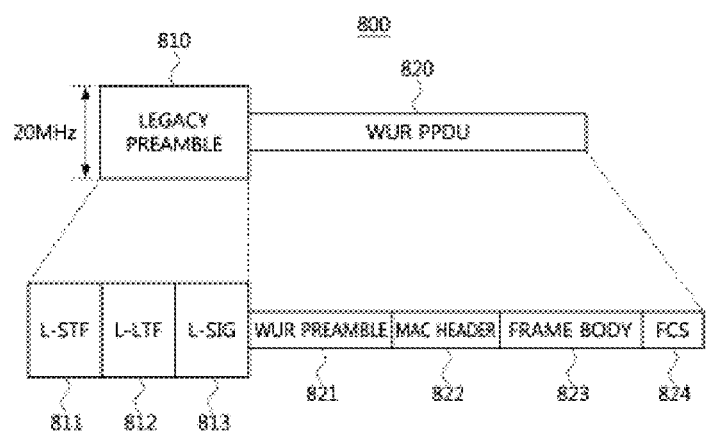
FIG. 8 is a block diagram illustrating a first embodiment of a wake-up packet in a WLAN based communication system.

FIG. 8 is a block diagram illustrating a first embodiment of a wake-up packet in a WLAN based communication system.

Referring to FIG. 8, a wake-up packet 800 may include a legacy preamble 810 and a WR physical layer convergence protocol (PLCP) protocol data unit (PPDU) 820. Alternatively, the wake-up packet 800 may consist of only the WUR PPDU 820 except the legacy preamble 810. In this case, the wake-up packet 800 may be the WUR PPDU 820. The legacy preamble 810 may include a legacy short training field (L-STF) 811, a legacy long training field (L-LTF) 812, and a legacy signal (L-SIG) field 813. The size of the frequency band to which the legacy preamble 810 is mapped may be 20 MHz.

The WUR PPDU 820 may include a WUR preamble 821, a MAC header 822, a frame body 823, and a frame check sequence (FCS). The WUR PPDU 820 may be modulated based on the OOK scheme. The size of the frequency band to which the WUR PPDU 820 is mapped may be smaller than 20 MHz. The WUR preamble 821 may include a WUR-STF, a WUR-LTF, and a WUR-SIG field. Also, the WUR preamble 821 may include a pseudo random (PN) sequence used for synchronization between the AP and the low-power STA (e.g., WURx included in the low-power STA). Also, the PN sequence may indicate a data rate and bandwidth.

The MAC header 822 may include a transmitter address field and a receiver address field. For example, the transmitter address field of the MAC header 822 may indicate the address of the AP that transmitted the wake-up packet 800, and the receiver address field of the MAC header 822 may indicate the address (e.g., MAC address, AID, PAID, or the like) of the low-power STA to receive the wake-up packet 800. When the wake-up packet 800 is transmitted in a broadcast manner, the receiver address field of the MAC header 822 may indicate that the wake-up packet 800 is transmitted in the broadcast manner. When the wake-up packet 800 is transmitted in a multicast manner, the receiver address field of the MAC header 822 may indicate a multicast address (or, group address, group ID).

The wake-up packet 800 may further include information elements required for the low-power operation. For example, each of the MAC header 822 and the frame body 823 of the wake-up packet 800 may include at least one of information elements shown in Table 6 below.

TABLE 6

| Information element | Description |
| --- | --- |
| Poll indicator | Indicates whether a WU-Poll frame notifying that the low-power STA operates in the normal mode is transmitted |
| MU indicator | Indicates whether the wake-up signal is used for single user (MU) transmission or multi-user (MU) transmission |
| Quality Information | Information on quality of data to be transmitted to the low-power STA (e.g., QoS-related information, AC, etc.). The quality information is used as a reference value for the mode transition time |

The Poll indicator may have a size of 1 bit. A Poll indicator set to '0' may indicate that transmission of a WU-Poll frame is not required, and a Poll indicator set to '1' may indicate that transmission of a WU-Poll frame is required. The MU indicator may have a size of 1 bit. An MU indicator set to '0' may indicate that wake-up packet 800 is used for a single user transmission, and an MU indicator set to '1' may indicate that wake-up packet 800 is used for a multi-user (MU) transmission. Also, the MU indicator set to '1' may indicate that a trigger frame for triggering the MU transmission is transmitted. Since the size of the frequency band to which the legacy preamble 810 is mapped is different from the size of the frequency band allocated to the WUR PPDU 820, when a transmission power of the legacy preamble 810 is equal to that of the WUR PPDU 820, the following problems may occur.

Figure 9:
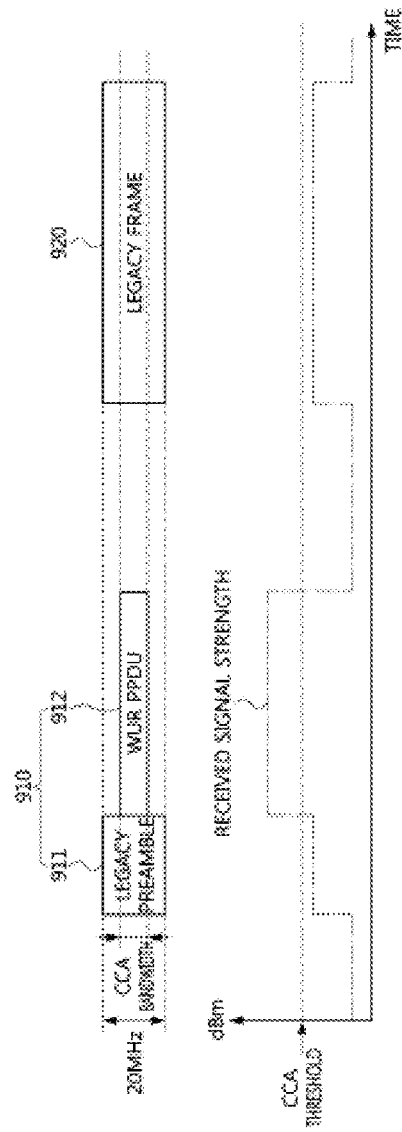
FIG. 9 is a conceptual diagram illustrating a first embodiment of received signal strengths in a WLAN based communication system.
Figure 10:
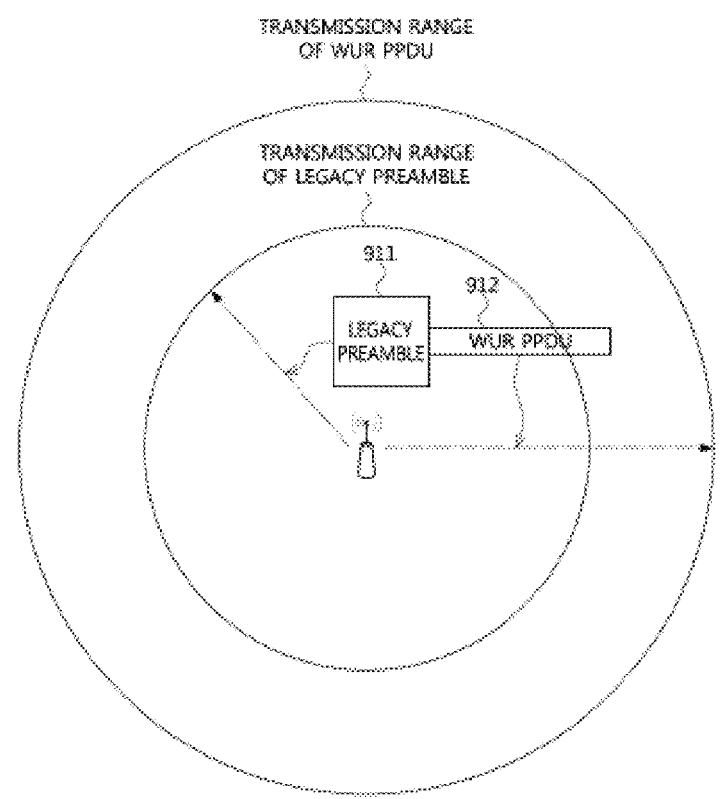
FIG. 10 is a conceptual diagram illustrating a transmission range of a wake-up packet in a WLAN based communication system.

FIG. 9 is a conceptual diagram illustrating a first embodiment of received signal strengths in a WLAN based communication system, and FIG. 10 is a conceptual diagram illustrating a transmission range of a wake-up packet in a WLAN based communication system.

Referring to FIGS. 9 and 10, a wake-up packet 910 may be configured to be the same as or similar to the wake-up packet 800 shown in FIG. 8. For example, the wake-up packet 910 may include a legacy preamble 911 and a WUR PPDU 912. The legacy preamble 911 may be transmitted over a 20 MHz bandwidth and the WUR PPDU 912 may be transmitted over a bandwidth less than 20 MHz. The legacy frame 920 (e.g., a legacy signal) may be a frame configured according to the IEEE 802.11 standard (e.g., IEEE 802.11a/b/g/n/p/ac/ax/ad/ay).

In case that the bandwidth configured for transmission of the WUR PPDU 912 is smaller than that of the legacy preamble 911 and the legacy frame 920, when transmission powers of the legacy preamble 911, the WUR PPDU 912 and the legacy frame 920 are set equally, the received signal strength of the WUR PPDU 912 may be greater than those of the legacy preamble 911 and the legacy frame 920 when the CCA operation is performed in the frequency band of less than 20 MHz by the WURx. Therefore, the received signal strength of the WUR PPDU 912 measured by the WURx may be greater than or equal to a CCA threshold, and the received signal strength of each of the legacy preamble 911 and the legacy frame 920 may be less than the CCA threshold.

In this case, the receiving communication node (e.g., AP, legacy STA, low-power STA) may determine that the channel state is busy since the received signal strength of the WUR PPDU 912 is greater than the CCA threshold. On the other hand, the receiving communication node may determine that the channel state is idle since the received signal strength of each of the legacy preamble 911 and the legacy frame 920 is less than the CCA threshold, and may determine that the legacy preamble 911 and the legacy frame 920 are not present. Therefore, when a channel access procedure based on the CCA result measured by the WURx is performed, a communication error (e.g., frame collision) may occur in the WLAN based communication system.

Also, when the transmission powers of the legacy preamble 911 and the WUR PPDU 912 are configured to be the same, a transmission range of the WUR PPDU 912 may be longer than that of the legacy preamble 911. Thus, a low-power STA located between a boundary of the transmission range of the legacy preamble 911 and a boundary of the transmission range of the WUR PPDU 912 may receive the WUR PPDU 912, determine that the low-power STA is located within the coverage of the AP when the WUR PPDU 912 is received, and perform transmission and reception procedures of legacy frames by transitioning from the WUR mode to the normal mode. However, since the low-power STA located between the boundary of the transmission range of the legacy preamble 911 and that of the WUR PPDU 912 may not receive the legacy frame from the AP, a communication error (e.g., frame collision) may occur when an channel access procedure is performed based on the CCA result measured by the WURx.

The transmission power of the WUR PPDU 812 may be configured to be smaller than the transmission power of the legacy preamble 811 in order to configure the transmission ranges of the legacy preamble 811 and the WUR PPDU 812 to be the same. In this case, the following problems may occur.

Figure 11:
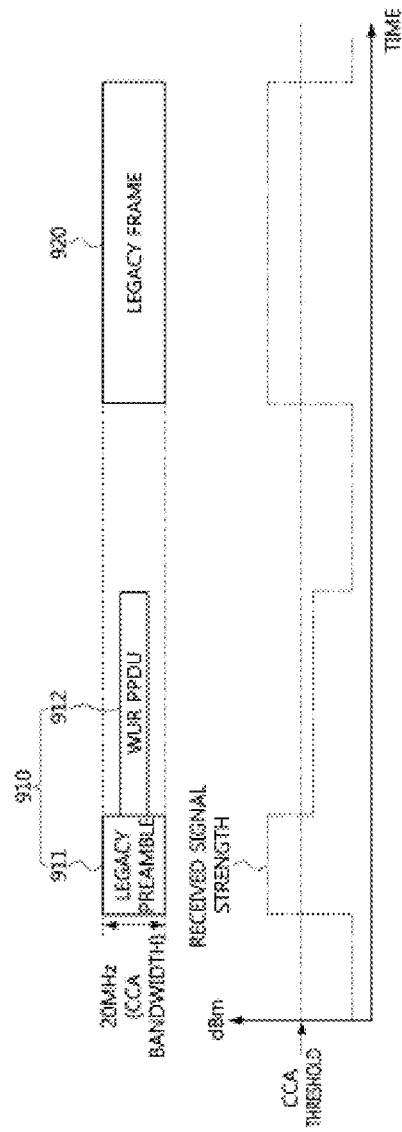
FIG. 11 is a conceptual diagram illustrating a second embodiment of received signal strengths in a WLAN based communication system.

FIG. 11 is a conceptual diagram illustrating a second embodiment of received signal strengths in a WLAN based communication system.

Referring to FIG. 11, the transmission power of the WUR PPDU 912 may be configured to be smaller than the transmission power of each of the legacy preamble 911 and the legacy frame 920. In this case, the transmission range of the WUR PPDU 912 may be the same as the transmission range of each of the legacy preamble 911 and the legacy frame 920, and the received signal strength of the WUR PPDU 912 may be less than the received signal strength of each of the legacy frame 911 and the legacy frame 920. Therefore, the received signal strength of the WUR PPDU 912 may be less than the CCA threshold, and the received signal strength of each of the legacy preamble 911 and the legacy frame 920 may be greater than or equal to the CCA threshold.

In this case, since the received signal strength of each of the legacy preamble 911 and the legacy frame 920 is equal to or greater than the CCA threshold, the receiving communication node (e.g., AP, legacy STA, low-power STA) may determine that the channel state is busy. On the other hand, the receiving communication node may determine that the channel state is idle and the WUR PPDU 912 is not present when the received signal strength of the WUR PPDU 912 is less than the CCA threshold. Therefore, a communication error (e.g., frame collision) may occur in the WLAN based communication system.

In order to solve the above-described problems, the wake-up packet may be configured as follows.

Figure 12:
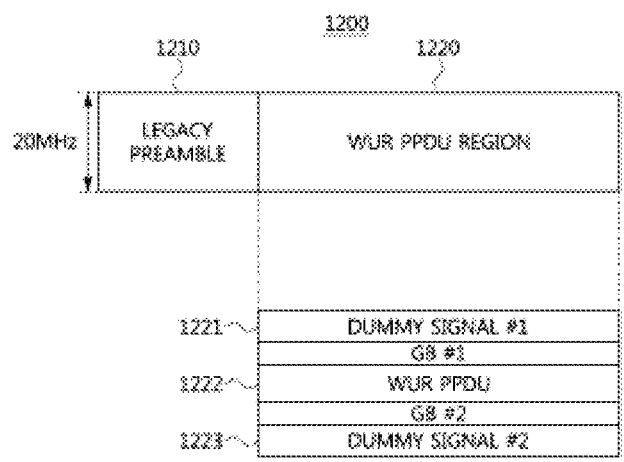
FIG. 12 is a block diagram illustrating a second embodiment of a wake-up packet in a WLAN based communication system.

FIG. 12 is a block diagram illustrating a second embodiment of a wake-up packet in a WLAN based communication system.

Referring to FIG. 12, a wake-up packet 1200 may include a legacy preamble 1210 and a WUR PPDU region 1220. The size of the frequency band to which the legacy preamble 1210 and the WUR PPDU region 1220 are mapped may be 20 MHz and the transmission power of the legacy preamble 1210 may be configured equally to the transmission power of the WUR PPDU region 1220. The legacy preamble 1210 may be configured to be the same as or similar to the legacy preamble 810 shown in FIG. 8. For example, the legacy preamble 1210 may include an L-STF, an L-LTF, and an L-SIG field.

The WUR PPDU region 1220 may include dummy signals 1221 and 1223 and a WUR PPDU 1222. A bit stream of the dummy signal #1 1221 and the dummy signal #2 1223 may be filled with '1'. The WUR PPDU 1222 may be configured to be the same as or similar to the WUR PPDU 820 shown in FIG. 8. For example, the WUR PPDU 1222 may include a WUR preamble, a MAC header, a frame body, and an FCS field. In the WUR PPDU region 1220, the dummy signals 1221 and 1223 and the WUR PPDU 1122 may be configured based on a frequency division multiplexing scheme.

Alternatively, a guard band (GB) may be configured between the WUR PPDU 1222 and the dummy signals 1221 and 1223. For example, a GB #1 may be set between the dummy signal 1221 and the WUR PPDU 1222, and a GB #2 may be set between the WUR PPDU 1222 and the dummy signal 1223.

Information of the frequency band (e.g., center frequency, bandwidth) to which the WUR PPDU 1222 is mapped may be signaled to the low-power STA in the procedure shown in FIG. 7. For example, the information of the frequency band to which the WUR PPDU 1222 is mapped may be included in the LP support response frame 702 or the association response frame of FIG. 7.

Figure 13:
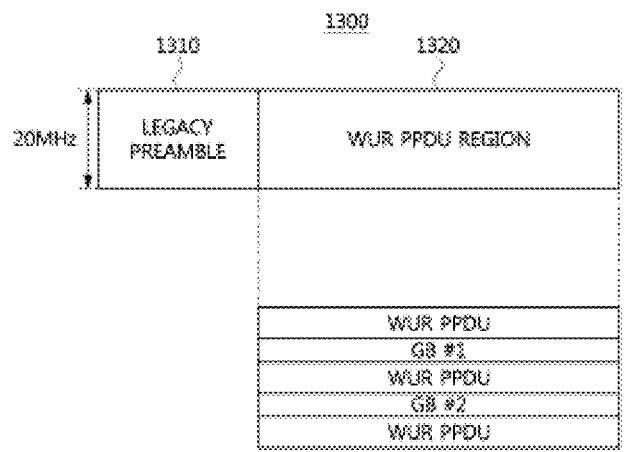
FIG. 13 is a block diagram illustrating a third embodiment of a wake-up packet in a WLAN based communication system.

FIG. 13 is a block diagram illustrating a third embodiment of a wake-up packet in a WLAN based communication system.

Referring to FIG. 13, a wake-up packet 1300 may include a legacy preamble 1310 and a WUR PPDU region 1320. The size of the frequency band to which the legacy preamble 1310 and the WUR PPDU region 1320 are mapped may be 20 MHz and the transmission power of the legacy preamble 1310 may be configured equally to the transmission power of the WUR PPDU region 1320. The legacy preamble 1310 may be configured to be the same as or similar to the legacy preamble 810 shown in FIG. 8. For example, the legacy preamble 1310 may include an L-STF, an L-LTF, and an L-SIG field.

The WUR PPDU region 1320 may include a plurality of WUR PPDUs. Each of the plurality of WUR PPDUs may be configured the same as or similar to the WUR PPDU 820 shown in FIG. 8. For example, each of the plurality of WUR PPDUs may include a WUR preamble, a MAC header, a frame body, and an FCS field. The WUR PPDU of the WUR PPDU area 1320 may be duplicated in the frequency band or may be extended in the frequency band. Alternatively, the plurality of WUR PPDUs may be multiplexed in the frequency band. For example, the WUR PPDU region 1320 may include the same three WUR PPDUs, and the size of the frequency band to which each of the three WUR PPDUs is mapped may be 4 MHz. Alternatively, a GB may be configured between the WUR PPDUs in the WUR PPDU region 1320. For example, a GB #1 may be configured between the first WUR PPDU and the second WUR PPDU, and a GB #2 may be configured between the second WUR PPDU and the third WUR PPDU. Also, each of the plurality of WUR PPDUs may have information for different communication nodes. That is, the plurality of WUR PPDUs may be multiplexed in the frequency band. In this case, an indicator indicating a position of the frequency band in which each of the plurality of WUR PPDUs is transmitted may be signaled through a frame exchange procedure before the wake-up packet or the wake-up packet.

Alternatively, the WUR PPDU may be transmitted over an extended bandwidth. For example, even when the WUR PPDU is negotiated to be transmitted through the 4 MHz frequency band between the transmitting communication node and the receiving communication node, the transmitting communication node may transmit the WUR PPDU through the 16 MHz or 20 MHz frequency band. In this case, the WUR PPDU may be designed so that the receiving communication node can easily perform the OOK demodulation operation based on an energy detection scheme. Alternatively, the WUR PPDU may be configured without a GB in the frequency band. Alternatively, frequency tones outside the band in an ON signal period may be multiplied by a coefficient 1 or −1, and the frequency tones outside the band in an OFF signal period may be multiplied by a coefficient 0.

Information of the frequency band to which the WUR PPDUs are mapped (e.g., center frequency, bandwidth), information on the duplication, and the type of the multiplexed WUR PPDUs (e.g., frequency extension of the WUR PPDU, the number of multiplexed and duplicated WUR PPDUs, extended bandwidth, etc.) may be signaled to the low-power STA in the procedure shown in FIG. 7. For example, the information of the frequency band to which the WUR PPDUs are mapped, the frequency band pattern of the duplicated and multiplexed WUR PPDUs, whether to use the extended WUR PPDU, and the like may be included in the LP support response frame 702 or the association response frame have.

Figure 14:
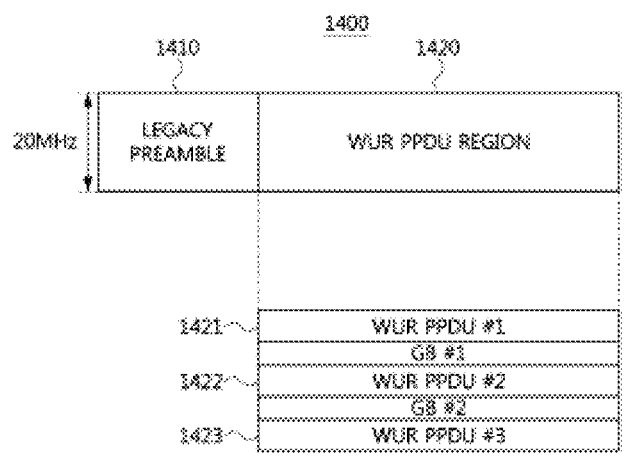
FIG. 14 is a block diagram illustrating a fourth embodiment of a wake-up packet in a WLAN based communication system.

FIG. 14 is a block diagram illustrating a fourth embodiment of a wake-up packet in a WLAN based communication system.

Referring to FIG. 14, a wake-up packet 1400 may include a legacy preamble 1410 and a WUR PPDU region 1420. The size of the frequency band to which the legacy preamble 1410 and the WUR PPDU region 1420 are mapped may be 20 MHz and the transmission power of the legacy preamble 1410 may be configured equally to the transmission power of the WUR PPDU region 1420. The legacy preamble 1410 may be configured to be the same as or similar to the legacy preamble 810 shown in FIG. 8. For example, the legacy preamble 1410 may include an L-STF, an L-LTF, and an L-SIG field.

The WUR PPDU region 1420 may include a plurality of WUR PPDUs 1421, 1422 and 1423. Each of the plurality of WUR PPDUs 1421, 1422 and 1423 may be configured the same as or similar to the WUR PPDU 820 shown in FIG. 8. For example, each of the plurality of WUR PPDUs 1421, 1422 and 1423 may include a WUR preamble, a MAC header, a frame body, and an FCS field. Each of the plurality of WUR PPDUs 1421, 1422 and 1423 may be configured based on the OFDM scheme. For example, the size of the frequency band to which each of the plurality of WUR PPDUs 1421, 1422 and 1423 is mapped may be 4 MHz. Alternatively, a GB may be configured between the plurality of WUR PPDUs 1421, 1422 and 1423. For example, a GB #1 may be configured between the WUR PPDU 1421 and the WUR PPDU 1422, and a GB #2 may be configured between the WUR PPDU 1422 and the WUR PPDU 1423.

Also, the plurality of WUR PPDUs 1421, 1422 and 1423 may be respectively configured for different low-power STAs. For example, the WUR PPDU 1421 may be a signal requesting wake up of a low-power STA #1 (e.g., a PCR included in the low-power STA #1), the WUR PPDU 1422 may be a signal requesting wake up of a low-power STA #2 (e.g., a PCR included in the low-power STA #2), and the WUR PPDU 1423 may be a signal requesting wake up of a low-power STA #3 (e.g., a PCR included in the low-power STA #3).

Information (e.g., center frequency, bandwidth) of a frequency band to which each of the plurality of WUR PPDUs 1421, 1422 and 1423 is mapped may be signaled to the low-power STA in the procedure shown in FIG. 7. For example, information related to the type of wake-up packet including the information on the frequency band to which each of a plurality of WUR PPDUs 1421, 1422 and 1423 is mapped may be included in the LP support response frame 702 or the association response frame of FIG. 7.

When the communication node (e.g., another AP, legacy STA, low-power STA) located within the coverage of the corresponding AP receives the wake-up packet 1200, 1300 or 1400 from the corresponding AP in the embodiments of FIGS. 12 to 14, the received signal strengths of the legacy preambles 1210, 1310 and 1410 and the WUR PPDU regions 1220, 1320 and 1420 measured by the communication node may all be greater than or equal to the CCA threshold. On the other hand, when the communication node (e.g., another AP, legacy STA, low-power STA) located outside the coverage of the corresponding AP receives the wake-up packet 1200, 1300 or 1400 from the corresponding AP, the received signal strengths of the legacy preambles 1210, 1310 and 1410 and the WUR PPDU regions 1220, 1320 and 1420 measured by the communication node may all be less than the CCA threshold. Therefore, the problems according to FIGS. 9 to 11 may be solved, so that a communication error (e.g., frame collision) in the WLAN based communication system may be solved.

Communication Procedure Between AP and Low-Power STA

After the access procedure (or the procedure for requesting support of a low-power operation), a communication procedure between the AP and the low-power STA in a WLAN based communication system may be performed as follows.

Figure 15:
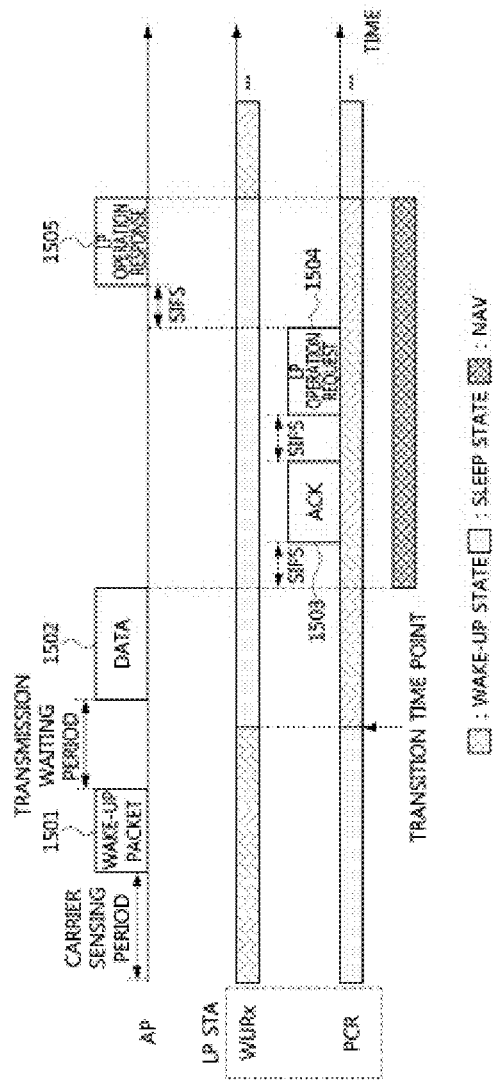
FIG. 15 is a timing chart illustrating a second embodiment of an operation method of a communication node in a WLAN based communication system.

FIG. 15 is a timing chart illustrating a second embodiment of an operation method of a communication node in a WLAN based communication system.

Referring to FIG. 15, a WLAN based communication system may include an AP, a low-power STA, and the like. The low-power STA may belong to coverage of the AP and may access the AP. The AP and the low-power STA may operate based on the EDCA scheme shown in FIG. 3. The AP and the low-power STA may be the same as or similar to the low-power STA 500 of FIG. 5. Also, the AP and the low-power STA may further include a WUTx as compared to the low-power STA 500 of FIG. 5.

When data to be transmitted to the low-power STA is present at the AP, the AP may generate a wake-up packet 1501. The wake-up packet 1501 may be configured to be the same as or similar to the wake-up packet shown in FIGS. 8 and 12 to 14. For example, the wake-up packet 1501 may request the low-power STA to operate in the normal mode and may be modulated in the OOK manner. The wake-up packet 1501 may further include a Poll indicator, and the Poll indicator may indicate that transmission of the WU-Poll frame is not required.

The AP may perform a carrier sensing operation during a predetermined period (e.g., carrier sensing period). The predetermined period may be SIFS, PIFS, 'DIFS+backoff period', 'AIFS [AC_VO]+backoff [AC_VO] period', 'AIFS [AC_VI]+backoff [AC_VI] period', 'AIFS [AC_BE]+backoff [AC_BE] period' or 'AIFS [AC_BK]+backoff [AC_BK] period'. For example, when the data to be transmitted to the low-power STA is non-QoS data, the AP may perform the carrier sensing operation during (DIFS+backoff period). When the data to be transmitted to the low-power STA is QoS data, the AP may perform the carrier sensing operation during (AIFS+backoff period) according to an AC of the QoS data.

When the channel state is determined to be idle during the predetermined period, the AP may transmit the wake-up packet 1501 to the low-power STA. The wake-up packet 1501 may be transmitted in a broadcast manner, a multicast manner, or a unicast manner. When the wake-up packet 1501 includes a legacy preamble and a WUR PPDU, a transmission bandwidth of the legacy preamble of the wake-up packet 1501 may be 20 MHz and a transmission bandwidth of the WUR PPDU of the wake-up packet 1501 may be 20 MHz or smaller than 20 MHz. For example, the transmission bandwidth of the WUR PPDU of the wake-up packet 1501 may be 4 MHz, 8 MHz, 16 MHz, or the like. On the other hand, when the channel state is determined to be busy during the predetermined period, the AP may perform the carrier sensing operation again.

Meanwhile, a WURx of the low-power STA operating in the WUR mode (e.g., PCR: sleep state, WURx: wake-up state) may perform a monitoring operation (e.g., carrier sensing operation) to receive the wake-up packet 1501. When the wake-up packet 1501 is received from the AP, the operation mode of the low-power STA may transition from the WUR mode to the normal mode (e.g., PCR: wake-up state, WURx: sleep state). Also, the low-power STA receiving the wake-up packet 1501 may operate in the normal mode when the receiver address field of the wake-up packet 1501 indicates the low-power STA. The low-power STA operating in the normal mode may perform subsequent operations based on the information included in the wake-up packet 1501 received in the WUR mode. When the Poll indicator included in the wake-up packet 1501 indicates that the transmission of the WU-Poll frame is not required, the low-power STA may maintain the normal mode for a predetermined time without transmitting the WU-Poll frame. The transmission and reception procedure of data frames may be performed during the normal mode.

Meanwhile, the AP may generate a data frame 1502 and may transmit the data frame 1502 to the low-power STA after a transmission waiting period from the transmission end time point of the wake-up packet. The transmission waiting period may be configured based on the mode transition time of the low-power STA that received the wake-up packet 1501. For example, the transmission waiting period may be equal to or longer than the mode transition time of the low-power STA, and may start from the transmission end time point of the wake-up packet 1501. Therefore, when the transmission waiting period has elapsed from the transmission end time point of the wake-up packet 1501, the AP may determine that the low-power STA operates in the normal mode.

The carrier sensing operation may be performed after the transmission waiting period, and the AP may transmit the data frame 1502 to the low-power STA after the carrier sensing period when the channel state is determined to be idle. The carrier sensing period may be configured to (DIFS+backoff period) or (AIFS+backoff period). When the channel state is determined to be busy during the carrier sensing period, the AP may stop a current backoff value (e.g., a random access procedure), and if the channel state changes from the busy state to the idle state, the carrier sensing operation may be performed again during (DIFS+a period corresponding to the stopped backoff value) or (AIFS+a period corresponding to the stopped backoff value). When the duration of (DIFS+a period corresponding to the stopped backoff value) or (AIFS+period corresponding to the stopped backoff value) expires, the AP may transmit the data frame 1502 to the low-power STA. If the response of the data frame 1502 is not received from the low-power STA within a predetermined time, the AP may determine that the data frame 1502 has failed to transmit and may configure the carrier sensing period again. For example, the contention window for the reconfigured carrier sensing period may be twice the contention window for the previous carrier sensing period. When the channel occupation by another communication node is terminated, the AP may perform a carrier sensing operation during the configured carrier sensing period, and when the channel state is idle during the configured carrier sensing period, the AP may transmit the data frame 1502 to the low-power STA.

Also, in order to prevent the channel from being occupied by other communication nodes in the transmission waiting period, the AP may repeatedly transmit the wake-up packet 1501 (e.g., some of the signals in the wake-up packet 1501) in the transmission waiting period. Alternatively, the AP may repeatedly transmit a dummy signal in the transmission waiting period. Alternatively, the AP may transmit a frame (e.g., a data frame for a legacy STA) for another STA in the transmission waiting period.

Meanwhile, a duration field included in the data frame 1502 may indicate a duration corresponding to (SIFS+ACK frame 1503), a duration corresponding to (SIFS+ACK frame 1503+SIFS+LP operation request frame 1504), or a duration corresponding to (SIFS+ACK frame 1503+SIFS+LP operation request frame 1504+SIFS+LP operation response frame 1505).

The duration field included in the data frame 1502 may be set based on operation mode transition procedures to be described below. For example, when operation mode transition procedures #1 and #2 are used, the duration field included in the data frame 1502 may indicate a duration corresponding to the duration corresponding to (SIFS+ACK frame 1503). When an operation mode transition procedure #4 is used, the duration field included in the data frame 1502 may indicate the duration corresponding to (SIFS+ACK frame 1503+SIFS+LP operation request frame 1504). When an operation mode transition procedure #5 is used, the duration field included in the data frame 1502 may indicate the duration corresponding to (SIFS+ACK frame 1503+SIFS+LP operation request frame 1504+SIFS+LP operation response frame 1505). The other communication node receiving the data frame 1502 may set a network allocation vector (NAV) based on the duration field included in the data frame 1502.

Meanwhile, the PCR of the low-power STA may receive the data frame 1502 from the AP. When a decoding operation of the data frame 1502 has been successfully completed, the PCR of the low-power STA may transmit an ACK frame

1503 to the AP in response to the data frame 1502. The ACK frame 1503 may be transmitted after an SIFS from the reception end time point of the data frame 1502. When the ACK frame 1503 is received from the low-power STA, the AP may determine that the data frame 1502 has been successfully received at the low-power STA.

On the other hand, when a channel condition between the AP and the low-power STA is bad, the PCR of the low-power STA may not receive the data frame 1502 from the AP. For example, when the low-power STA fails to receive the data frame 1502 from the AP during a predetermined period (e.g., reception waiting period) from the transition point from the WUR mode to the normal mode, the low-power STA enters the WUR mode. The reception waiting period may be set by the AP, and the AP may transmit information indicating the set reception waiting period to the low-power STA through the wake-up packet 1501, the LP support response frame 701, or the association response frame shown in FIG. 7. Also, when a response to the data frame 1502 is not received from the low-power STA, the AP may determine that the low-power STA operates in the WUR mode after the reception waiting period, and perform a procedure of retransmitting the wake-up packet by considering the reception waiting period.

When the transmission and reception procedure of the data frame 1502 is completed, an operation mode transition procedure of the low-power STA may be performed. The operation mode transition procedure of the low-power STA may be performed in five manners as follows.

Operation Mode Transition Procedure #1 (Using ACK Frame 1503)

The low-power STA may operate in the WUR mode after transmitting the ACK frame 1503 to the AP in response to the data frame 1502. For example, at the transmission end time point of the ACK frame 1503, the operation mode of the low-power STA may transition from the normal mode to the WUR mode. Here, the ACK frame 1503 may include an indicator indicating that the low-power STA operates in the WUR mode. When the ACK frame 1503 is received from the low-power STA, the AP may determine that the low-power STA is operating in the WUR mode.

Operation Mode Transition Procedure #2 (Using ACK Frame 1503)

When a frame (e.g., a signal) is not received from the AP within a predetermined period (e.g., the reception waiting period) from the transmission end time point of the ACK frame 1503, the low-power STA may operate in the WUR mode after expiration of the reception waiting period. The reception waiting period may be set by the AP and the AP may transmit information indicating the reception waiting period to the low-power STA through the wake-up packet 1501, the LP support response frame 702, or the association response frame shown in FIG. 7.

Operation Mode Transition Procedure #3 (Using 'ACK Frame 1503+LP Operation Response Frame 1505')

When the ACK frame 1503 is received that is the response to the data frame 1502 from the low-power STA, the AP may generate the LP operation response frame 1505 approving the low-power STA to operate in the WUR mode. Here, the ACK frame 1503 may include an indicator requesting approval of the WUR mode operation, and the LP operation response frame 1505 may be generated when data to be transmitted to the low-power STA is not present at the AP. The AP may transmit the LP operation response frame 1505 to the low-power STA. The LP operation response frame 1505 may be transmitted after a SIFS from the reception end time point of the ACK frame 1503. The LP operation response frame 1505 may be configured to be an action frame or a null data frame. The low-power STA receiving the LP operation response frame 1505 may operate in the WUR mode and the AP transmitting the LP operation response frame 1505 may determine that the low-power STA operates in the WUR mode.

Operation Mode Transition Procedure #4 (Using 'ACK Frame 1503+LP Operation Request Frame 1504')

After transmission of the ACK frame 1503, which is a response to the data frame 1502, the low-power STA may generate the LP operation request frame 1504 informing it to operate in the WUR mode, and transmit the generated LP operation request frame 1504 to the AP. The LP operation request frame 1504 may be transmitted by the PCR of the low-power STA and may be transmitted after a SIFS from the transmission end time point of the ACK frame 1503. The low-power STA may operate in the WUR mode after transmission of the LP operation request frame 1504. When the LP operation request frame 1504 is received from the low-power STA, the AP may determine that the low-power STA operates in the WUR mode after the reception end time point of the LP operation request frame 1504.

Operation Mode Transition Procedure #5 (Using 'ACK Frame 1503+LP Operation Request Frame 1504+LP Operation Response Frame 1505')

After transmission of the ACK frame 1503, which is a response to the data frame 1502, the low-power STA may generate the LP operation request frame 1504 requesting approval of the WUR mode operation, and transmit the generated LP operation request frame 1504 to the AP. The LP operation request frame 1504 may be transmitted by the PCR of the low-power STA and may be transmitted after the transmission end time point of the ACK frame 1503. The AP receiving the LP operation request frame 1504 may generate the LP operation response frame 1505 approving the low-power STA to operate in the WUR mode when data to be transmitted to the low-power STA is not present at the AP. The AP may transmit the LP operation response frame 1505 to the low-power STA. The LP operation response frame 1505 may be transmitted after a SIFS from the reception end time point of the LP operation request frame 1504. Here, the LP operation request frame 1504 and the LP operation response frame 1505 may be configured to be an action frame or a null data frame. The low-power STA receiving the LP operation response frame 1505 may operate in the WUR mode, and the AP transmitting the LP operation response frame 1505 may determine that the low-power STA operates in the WUR mode.

On the other hand, when the ACK frame for the data frame is not received at the AP, a retransmission procedure of the data frame may be performed as follows.

Figure 16:
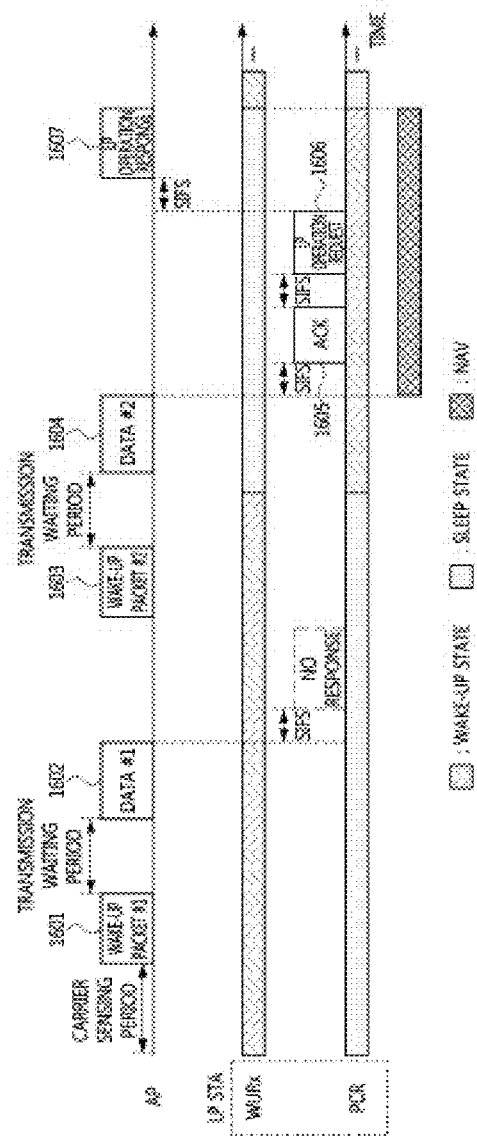
FIG. 16 is a timing chart illustrating a third embodiment of an operation method of a communication node in a WLAN based communication system.

FIG. 16 is a timing chart illustrating a third embodiment of an operation method of a communication node in a WLAN based communication system.

Referring to FIG. 16, a WLAN based communication system may include an AP, a low-power STA, and the like. The low-power STA may belong to coverage of the AP and may access the AP. The AP and the low-power STA may be the same as or similar to the low-power STA 500 of FIG. 5. Also, the AP and the low-power STA may further include a WUTx as compared to the low-power STA 500 of FIG. 5. The AP and the low-power STA may operate based on the EDCA scheme shown in FIG. 3. Each of wake-up packets 1601 and 1603, data frames 1602 and 1604, an ACK frame 1605, an LP operation request frame 1606, an LP operation response frame 1607, a carrier sensing period and a transmitting waiting period of FIG. 16 may be configured to be the same as or similar to the wake-up packet 1501, the data frame 1502, the ACK frame 1503, the LP operation request frame 1504, the LP operation response frame 1505, the carrier sensing period and the transmission waiting period of FIG. 15.

The WURx of the low-power STA operating in the WUR mode (e.g., PCR: sleep state, WURx: wake-up state) may perform a monitoring operation (e.g., carrier sensing operation) to receive the wake-up packet 1601. When there is data to be transmitted to the low-power STA, the AP may generate the wake-up packet #1 1601. The wake-up packet #1 1601 may be configured to be the same as or similar to the wake-up packet shown in FIGS. 8 and 12 to 14. For example, the wake-up packet #1 1601 may request the low-power STA to operate in the normal mode and may be modulated in the OOK manner. The wake-up packet #1 1601 may further include a Poll indicator, and the Poll indicator may indicate that transmission of the WU-Poll frame is not required.

When the channel state is determined to be idle during the predetermined period (e.g., carrier sensing period), the AP may transmit the wake-up packet #1 1601 to the low-power STA. The wake-up packet #1 1601 may be transmitted in a broadcast manner, a multicast manner, or a unicast manner. When the wake-up packet #1 1601 includes a legacy preamble and a WUR PPDU, a transmission bandwidth of the legacy preamble of the wake-up packet #1 1601 may be 20 MHz and a transmission bandwidth of the WUR PPDU of the wake-up packet #1 1601 may be 20 MHz or smaller than 20 MHz. For example, the transmission bandwidth of the WUR PPDU of the wake-up packet #1 1601 may be 4 MHz, 8 MHz, 16 MHz, or the like.

After the transmission end time point of the wake-up packet #1 1601, the AP may transmit the data frame #1 1602 to the low-power STA through a channel access procedure after the transmission waiting period from the transmission end time point of the wake-up packet #1 1601. When a response to the data frame 1602 is not received within a timeout period (e.g., (SIFS+(2×time slot)+(ACK frame transmission time)) from the transmission end time point of the data frame 1602, the AP may determine that data frame 1602 is not received at the low-power STA. For example, the data frame 1602 may not be received or decoded at the low-power STA when the PCR of the low-power STA operates in the sleep mode or when the channel condition between the AP and the low-power STA is bad. Therefore, the low-power STA may not be able to transmit an ACK frame for the data frame #1 1602 to the AP.

In this case, the AP may perform a retransmission procedure of the data frame. For example, the AP may perform a carrier sensing operation during a carrier sensing period to transmit the wake-up packet #2 1603. The carrier sensing period for the wake-up packet #2 1603 may start after the timeout period from the transmission end time point of the data frame 1602. The carrier sensing period of the wake-up packet #2 1603 may be set based on the carrier sensing period of the wake-up packet #1 1601. For example, the carrier sensing period of the wake-up packet #2 1603 may be set equal to the carrier sensing period of the wake-up packet #1 1601. Alternatively, a contention window for the carrier sensing period of the wake-up packet #2 1603 may be set to be twice a contention window for the carrier sensing period of the wake-up packet #1 1601.

Here, the wake-up packet #2 1603 may be configured to be the same as the wake-up packet #1 1601. That is, the wake-up packet #2 1603 may be configured to be the same as or similar to the wake-up packet shown in FIGS. 8 and 12 to 14. For example, the wake-up packet #2 1603 may request the low-power STA to operate in the normal mode and may be modulated in the OOK manner. The wake-up packet #2 1603 may further include a Poll indicator, and the Poll indicator may indicate that transmission of the WU-Poll frame is not required.

When the channel state is determined to be idle during the carrier sensing period, the AP may transmit the wake-up packet #2 1603 to the low-power STA. After the transmission end time point of the wake-up packet #2 1603, the AP may perform a carrier sensing operation during a transmission waiting period, and transmit the data frame #2 1604 to the low-power STA when the channel state is determined to be idle during the transmission waiting period. The transmission waiting period of the data frame #2 1604 may be set to be the same as the transmission waiting period of the data frame #1 1602. Alternatively, a contention window for the transmission waiting period of the data frame #2 1604 may be set to be twice a contention window for the transmission waiting period of the data frame #1 1602.

When the wake-up packet #2 1603 is received from the AP, the operation mode of the low-power STA may transition from the WUR mode to the normal mode. Also, the low-power STA receiving the wake-up packet #2 1603 may operate in the normal mode when a receiver address field of the wake-up packet #2 1603 indicates the low-power STA. Then, transmission and reception procedures of the data frame #2 1604, an ACK frame 1605, an LP operation request frame 1606 and an LP operation response frame 1607 may be performed. The transmission and reception procedures of the data frame #2 1604, the ACK frame 1605, the LP operation request frame 1606 and the LP operation response frame 1607 may be performed identically or similarly to those of the data frame 1502, the ACK frame 1503, the LP operation request frame 1504 and the LP operation response frame 1505 as shown in FIG. 15.

On the other hand, the AP may receive a WU-Poll frame from the low-power STA, which is a response to the wake-up packet, instead of transmitting the data frame after the transmission waiting period from the transmission end time point of the wake-up packet. When the WU-Poll frame is received from the low-power STA, the AP may transmit a data frame to the low-power STA. Here, the WU-Poll frame may indicate that the low-power STA operates in the normal mode. Embodiments using the WU-Poll frame in the WLAN based communication system may be as follows.

Figure 17:
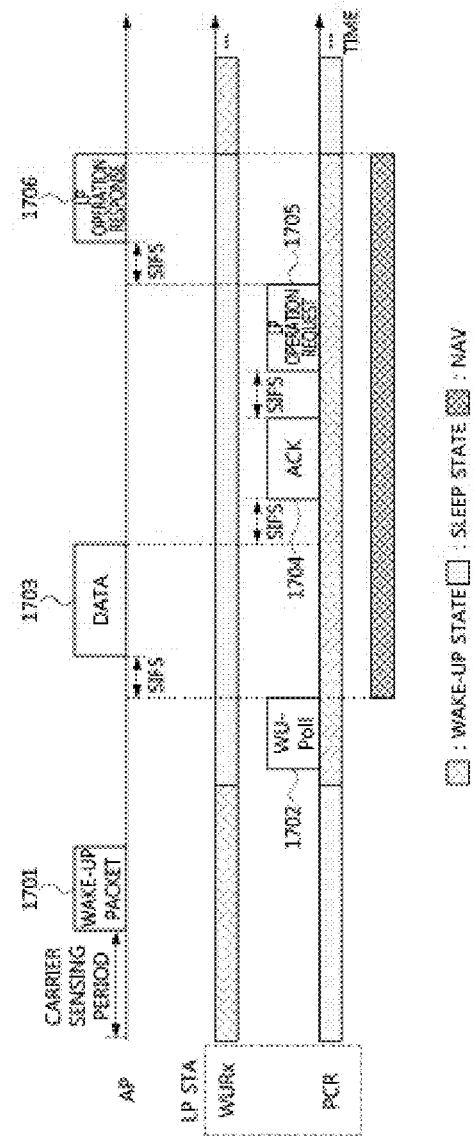
FIG. 17 is a timing chart illustrating a fourth embodiment of an operation method of a communication node in a WLAN based communication system.

FIG. 17 is a timing chart illustrating a fourth embodiment of an operation method of a communication node in a WLAN based communication system.

Referring to FIG. 17, a WLAN based communication system may include an AP, a low-power STA, and the like. The low-power STA may belong to coverage of the AP and may access the AP. The AP and the low-power STA may be the same as or similar to the low-power STA 500 of FIG. 5. Also, the AP and the low-power STA may further include a WUTx as compared to the low-power STA 500 of FIG. 5. The AP and the low-power STA may operate based on the EDCA scheme shown in FIG. 3. Each of a wake-up packet 1701, a data frame 1703, an ACK frame 1704, an LP operation request frame 1705, an LP operation response frame 1706, a carrier sensing period and a transmitting waiting period of FIG. 17 may be configured to be the same as or similar to the wake-up packet 1501, the data frame 1502, the ACK frame 1503, the LP operation request frame 1504, the LP operation response frame 1505, the carrier sensing period and the transmission waiting period of FIG. 15.

When there is data to be transmitted to the low-power STA, the AP may generate the wake-up packet 1701. The wake-up packet 1701 may be configured to be the same as or similar to the wake-up packet shown in FIGS. 8 and 12 to 14. For example, the wake-up packet 1701 may request the low-power STA to operate in normal mode and may be modulated in the OOK manner. The wake-up packet 1701 may further include a Poll indicator, and the Poll indicator may indicate that transmission of the WU-Poll frame is required. Also, the wake-up packet 1701 may further include information on quality (e.g., QoS-related information, AC information) of data included in the data frame 1703, a duration field, and the like.

The duration field of the wake-up packet 1701 may indicate the length of the data frame 1703 (e.g., a data unit included in the data frame 1703). Alternatively, the duration field of the wake-up packet 1701 may include a period from the transmission end time point of the wake-up packet 1701 to the transmission end time point of the WU-Poll frame 1702, a period from the transmission end time point of the wake-up packet 1701 to the transmission end time point of the ACK frame 1704, or a period from the transmission end time point of the wake-up packet 1701 to the transmission end time point of the LP operation response frame 1706. Therefore, another communication node receiving the wake-up packet 1701 may set a NAV based on the duration field of the wake-up packet 1701.

When the channel state is determined to be idle during the predetermined period (e.g., carrier sensing period), the AP may transmit the wake-up packet 1701 to the low-power STA. When the wake-up packet 1701 includes a legacy preamble and a WUR PPDU, a transmission bandwidth of the legacy preamble of the wake-up packet 1701 may be 20 MHz and a transmission bandwidth of the WUR PPDU of the wake-up packet 1701 may be 20 MHz or smaller than 20 MHz. For example, the transmission bandwidth of the WUR PPDU of the wake-up packet 1701 may be 4 MHz, 8 MHz, 16 MHz, or the like.

Meanwhile, a WURx of the low-power STA operating in the WUR mode (e.g., PCR: sleep state, WURx: wake-up state) may perform a monitoring operation (e.g., carrier sensing operation) to receive the wake-up packet 1701. When the wake-up packet 1701 is received from the AP and a receiver address field of the wake-up packet 1701 indicates the low-power STA, the operation mode of the low-power STA may transition from the WUR mode to the normal mode. Also, the WURx of the low-power STA may transmit the information (e.g., the address, the QoS related information, the AC information, the duration field, the Poll indicator) included in the wake-up packet 1701 to the PCR (or, baseband processor) of the low-power STA.

The low-power STA (e.g., PCR, baseband processor) may identify the information included in the wake-up packet 1701. When the Poll indicator included in the wake-up packet 1701 is set to '1', the low-power STA may determine that transmission of the WU-Poll frame is required. Thus, the PCR of the low-power STA may generate the WU-Poll frame 1702 indicating that the low-power STA operates in the normal mode, and may transmit the generated WU-Poll frame 1702 to the AP. In this case, the PCR of the low-power STA may perform a carrier sensing operation in the carrier sensing period according to the AC indicated by the wake-up packet 1701, and when the channel state is determined to be idle during the carrier sensing period, the PCR of the low-power STA may transmit the WU-Poll frame 1702 to the AP. The carrier sensing period for the WU-Poll frame 1702 may be SIFS, PIFS, 'DIFS+backoff period', 'AIFS [AC_VO]+backoff [AC_VO] period', 'AIFS [AC_VI]+backoff [AC_VI] period', 'AIFS [AC_BE]+backoff [AC_BE] period' or 'AIFS [AC_BK]+backoff [AC_BK] period' shown in FIG. 3.

The WU-Poll frame 1702 may be configured to be the same as or similar to a PS-Poll frame defined in the IEEE 802.11 standard. The WU-Poll frame 1702 may further include a duration field, and the duration field of the WU-Poll frame 1702 may indicate a period from the transmission end time point of the WU-Poll frame 1702 to the transmission end time point of the ACK frame 1704 or a period from the transmission end time point of the WU-Poll frame 1702 to the transmission end time point of the LP operation response frame 1706. Thus, another communication node receiving the WU-Poll frame 1702 may set a NAV based on the duration field of the WU-Poll frame 1702.

When the WU-Poll frame 1702 is received from the low-power STA, the AP may determine that the low-power STA operates in the normal mode. Accordingly, the AP may transmit the data frame 1703 to the low-power STA after an SIFS from the reception end time point of the WU-Poll frame 1702. Alternatively, the AP may transmit an ACK frame (not shown), which is a response of the WU-Poll frame 1702, to the low-power STA after an SIFS from the reception end time point of the WU-Poll frame 1702, and transmit the data frame 1703 to the low-power STA after an SIF from the transmission end time point of the ACK frame. The low-power STA may receive the data frame 1703 from the AP and may transmit an ACK frame 1704, which is a response to the data frame 1703, to the AP.

On the other hand, when a channel condition between the AP and the low-power STA is bad, the low-power STA may not receive the data frame 1703 from the AP. Alternatively, the AP may not transmit the data frame 1703 if the AP fails to receive the WU-Poll frame 1702 from the low-power STA, in which case the low-power STA may not receive the data frame 1703 from the AP. For example, when the low-power STA fails to receive the data frame 1703 from the AP during a predetermined period (e.g., reception waiting period) from the transmission end time point of the WU-Poll frame 1702, the low-power STA may operate in the WUR mode. The reception waiting period may be set by the AP, and the AP may transmit information indicating the reception waiting period to the low-power STA through the LP support response frame 702 or the association response frame shown in FIG. 7.

After the transmission and reception of the WU-Poll frame 1702 are completed, transmission and reception procedures of the data frame 1703, the ACK frame 1704, the LP operation request frame 1705 and the LP operation response frame 1706 may be performed. The transmission and reception procedures of the data frame 1703, the ACK frame 1704, the LP operation request frame 1705 and the LP operation response frame 1706 may be performed identically or similarly to those of the data frame 1502, the ACK frame 1503, the LP operation request frame 1504 and the LP operation response frame 1505 as shown in FIG. 15.

On the other hand, when the WU-Poll frame which is a response to the wake-up packet is not received at the AP, a retransmission procedure of the wake-up packet may be performed as follows.

Figure 18:
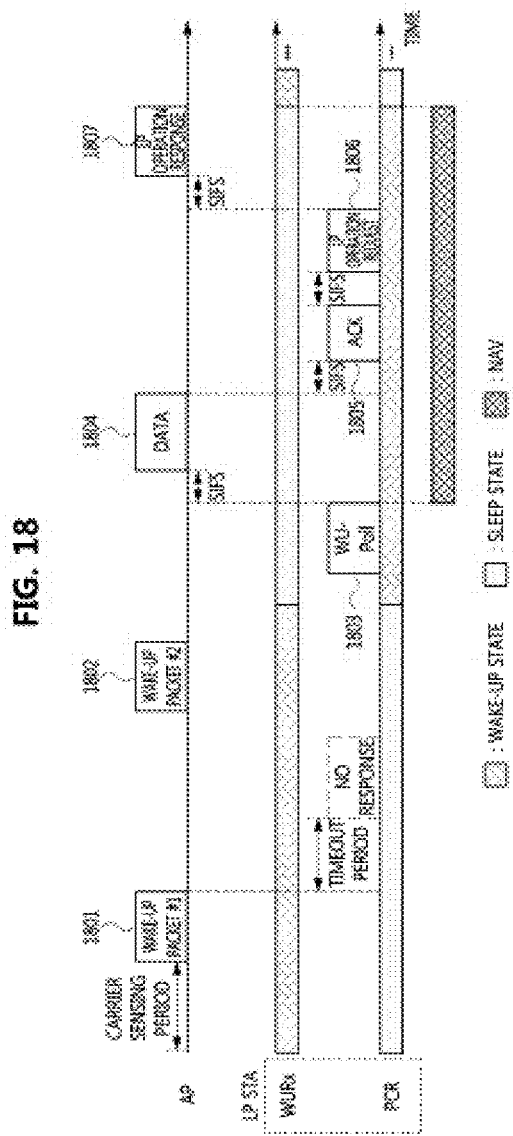
FIG. 18 is a timing chart illustrating a fifth embodiment of an operation method of a communication node in a WLAN based communication system.

FIG. 18 is a timing chart illustrating a fifth embodiment of an operation method of a communication node in a WLAN based communication system.

Referring to FIG. 18, a WLAN based communication system may include an AP, a low-power STA, and the like. The low-power STA may belong to coverage of the AP and may access the AP. The AP and the low-power STA may be the same as or similar to the low-power STA 500 of FIG. 5. Also, the AP and the low-power STA may further include a WUTx as compared to the low-power STA 500 of FIG. 5. The AP and the low-power STA may operate based on the EDCA scheme shown in FIG. 3. Each of wake-up packets 1801 and 1802, a WU-Poll frame 1803, a data frame 1804, an ACK frame 1805, an LP operation request frame 1806, an LP operation response frame 1807, a carrier sensing period and a transmitting waiting period of FIG. 18 may be configured to be the same as or similar to the wake-up packet 1701, the WU-Poll frame 1702, the data frame 1703, the ACK frame 1704, the LP operation request frame 1705, the LP operation response frame 1706, the carrier sensing period and the transmission waiting period of FIG. 17.

A WURx of the low-power STA operating in WUR mode (e.g., PCR: sleep state, WURx: wake-up state) may perform a monitoring operation (e.g., a carrier sensing operation) to receive the wake-up packets 1801 and 1802. When there is data to be transmitted to the low-power STA, the AP may generate the wake-up packet #1 1801. The wake-up packet #1 1801 may be configured to be the same as or similar to the wake-up packet shown in FIGS. 8 and 12 to 14. For example, the wake-up packet #1 1801 may request the low-power STA to operate in the normal mode and may be modulated in the OOK manner. The wake-up packet #1 1801 may further include a Poll indicator, and the Poll indicator may indicate that transmission of the WU-Poll frame is required. The wake-up packet #1 1801 may further include information on quality (e.g., QoS-related information, AC information) of data included in the data frame 1804, a duration field, and the like. When the channel state is determined to be idle during a predetermined period (e.g., carrier sensing period), the AP may transmit the wake-up packet #1 1801 to the low-power STA. The carrier sensing period may be SIFS, PIFS, 'DIFS+backoff period', 'AIFS [AC_VO]+backoff [AC_VO] period', 'AIFS [AC_VI]+backoff [AC_VI] period', 'AIFS [AC_BE]+backoff [AC_BE] period' or 'AIFS [AC_BK]+backoff [AC_BK] period' shown in FIG. 3.

The WU-Poll frame which is a response to the wake-up packet #1 1801 may not be received from the low-power STA within a timeout period (e.g., the transmission waiting period shown in FIG. 15) from the transmission end time point of the wake-up packet #1 1801. For example, when the wake-up packet #1 1801 fails to be successfully received (or decoded) at the low-power STA, or when the operation mode of the low-power STA fails to transition from the WUR mode to the normal mode within the timeout period, the low-power STA may not be able to transmit the WU-Poll frame which is the response to the wake-up packet #1 1801. When the WU-Poll frame, which is the response to the wake-up packet #1 1801, is not received from the low-power STA, the AP may determine that the low-power STA operates in the WUR mode. Therefore, the AP may perform a retransmission procedure of the wake-up packet #2 1802. The wake-up packet #2 1802 may be configured to be the same as or similar to the wake-up packet #1 1801.

The AP may perform a carrier sensing operation during a carrier sensing period for the retransmission procedure of the wake-up packet #2 1802. The carrier sensing period for the wake-up packet #2 1802 may start from the end point of the timeout period, and may be set based on the carrier sensing period of the wake-up packet #1 1801. For example, the carrier sensing period of the wake-up packet #2 1802 may be set equal to the carrier sensing period of the wake-up packet #1 1801. Alternatively, a contention window for the carrier sensing period of the wake-up packet #2 1802 may be set to be twice a contention window for the carrier sensing period of the wake-up packet #1 1801.

When the wake-up packet #2 1802 is received from the AP and a receiver address field of the wake-up packet #2 1802 indicates the low-power STA, the operation mode of the low-power STA may transition from the WUR mode to the normal mode. Also, the WURx of the low-power STA may transmit the information (e.g., the address, the QoS related information, the AC information, the duration field) included in the wake-up packet #2 1802 to the PCR (or, baseband processor) of the low-power STA.

The PCR of the low-power STA may transmit a WU-Poll frame 1803 to the AP indicating that the low-power STA operates in the normal mode. After the transmission and reception of the wake-up packet #2 1802 are completed, transmission and reception procedures of the WU-Poll frame 1803, the data frame 1804, an ACK frame 1805, an LP operation request frame 1806 and an LP operation response frame 1807 may be performed. The transmission and reception procedures of the WU-Poll frame 1803, the data frame 1804, the ACK frame 1805, the LP operation request frame 1806 and the LP operation response frame 1807 may be performed identically or similarly to those of the WU-Poll frame 1702, the data frame 1703, the ACK frame 1704, the LP operation request frame 1705 and the LP operation response frame 1706 as shown in FIG. 17.

Meanwhile, when the AP provides communication services to a plurality of low-power STAs, operating methods of a communication node may be as follows.

Figure 19:
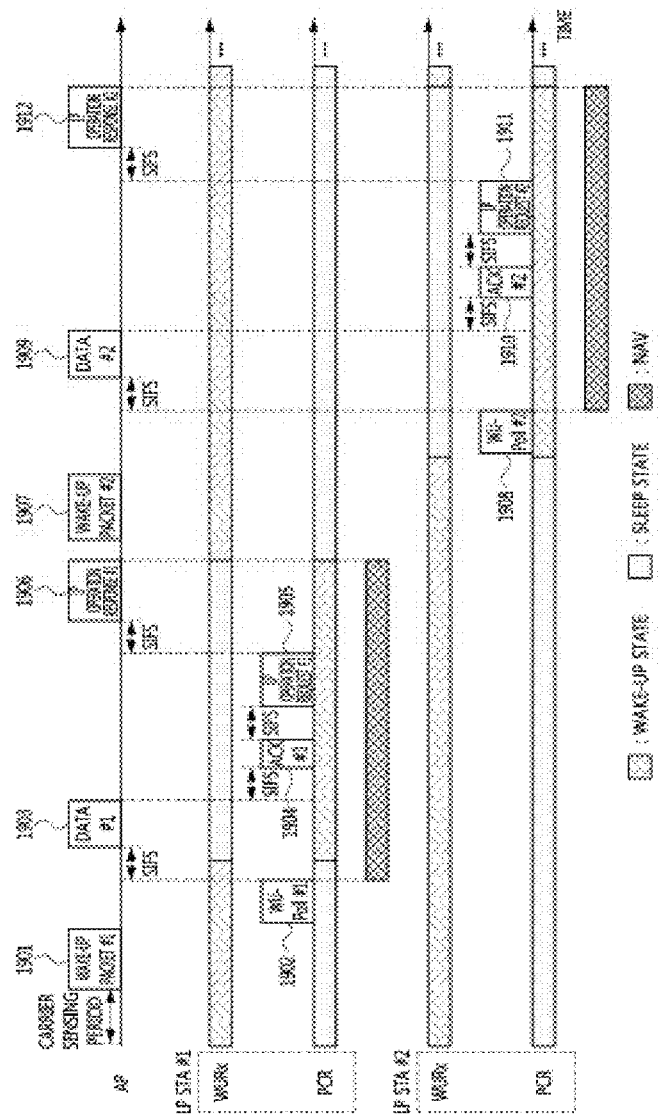
FIG. 19 is a timing chart illustrating a sixth embodiment of an operation method of a communication node in a WLAN based communication system.

FIG. 19 is a timing chart illustrating a sixth embodiment of an operation method of a communication node in a WLAN based communication system.

Referring to FIG. 19, a WLAN based communication system may include an AP, a low-power STA #1, a low-power STA #2, and the like. The low-power STA #1 and the low-power STA #2 may belong to coverage of the AP and may access the AP. The AP, the low-power STA #1, and the low-power STA #2 may be the same as or similar to the low-power STA 500 of FIG. 5. Also, the AP, the low-power STA #1, and the low-power STA #2 may further include a WUTx as compared to the low-power STA 500 of FIG. 5. The AP, the low-power STA #1, and the low-power STA #2 may operate based on the EDCA scheme shown in FIG. 3.

The data transmission and reception procedure between the AP and the low-power STA #1 (hereinafter referred to as 'data transmission and reception procedure #1') and the data transmission and reception procedure between the AP and the low-power STA #2 (hereinafter referred to as 'data transmission and reception procedure #2') may be performed consecutively in the time domain. For example, the data transmission and reception procedure #2 may be performed after the data transmission and reception procedure #1 is completed. The data transmission and reception procedure #1 may include transmission and reception procedures of a wake-up packet #1 1901, a WU-Poll frame #1 1902, a data frame #1 1903, an ACK frame #1 1904, an LP operation request frame #1 1905 and an LP operation response frame #1 1906. The data transmission and reception procedure #2 may include transmission and reception procedures of a wake-up packet #2 1907, a WU-Poll frame #2 1908, a data frame #2 1909, an ACK frame #2 1910, an LP operation request frame #2 1911 and an LP operation response frame #2 1912. Each of the data transmission and reception procedure #1 and the data transmission and reception procedure #2 may be performed identically to or similarly to those of the wake-up packet 1701, the WU-Poll frame 1702, the data frame 1703, the ACK frame 1704, the LP operation request frame 1705 and the LP operation response frame 1706 shown in FIG. 16.

The data transmission and reception procedure #1 and the data transmission and reception procedure #2 may be performed in different transmission opportunities (TXOPs), or may be performed in one TXOP. For example, when the size of data units to be transmitted to the low-power STAs #1 and #2 are equal to or larger than a preset threshold value, the data transmission and reception procedures #1 and #2 may be performed in different TXOPs. In this case, a TXOP #1 for the data transmission and reception procedure #1 may be configured to be a period from a transmission start time point of the wake-up packet #1 1901 to a transmission end time point of the LP operation response frame #1 1906, and a TXOP #2 for the data transmission and reception procedure #2 may be configured to be a period from a transmission start time point of the wake-up packet #2 1907 to a transmission end time point of the LP operation response frame #2 1912. Therefore, the AP may perform a carrier sensing operation to transmit the wake-up packet #2 1907 after expiration of the TXOP #1.

On the other hand, when the size of data units to be transmitted to the low-power STAs #1 and #2 are smaller than the preset threshold value, the data transmission and reception procedures #1 and #2 may be performed in one TXOP. The TXOP for the data transmission and reception procedures #1 and #2 may be configured to be a period from the transmission start time point of the wake-up packet #1 1901 to the transmission end time point of the LP operation response #2 frame 1912. In this case, the AP may transmit the wake-up packet #2 1907 after an SIFS from the transmission end time point of the LP operation response frame #1 1906.

On the other hand, when the AP provides communication services to a plurality of low-power STAs, communications may be performed based on a trigger frame. The communication methods based on the trigger frame may be as follows.

Figure 20:
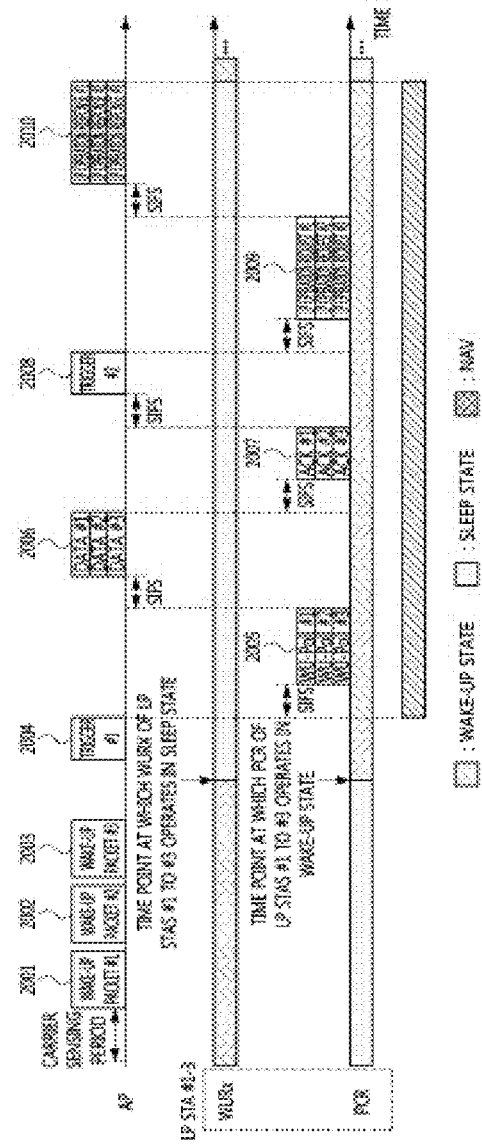
FIG. 20 is a timing chart illustrating a seventh embodiment of an operation method of a communication node in a WLAN based communication system.

FIG. 20 is a timing chart illustrating a seventh embodiment of an operation method of a communication node in a WLAN based communication system.

Referring to FIG. 20, a WLAN based communication system may include an AP, a low-power STA #1, a low-power STA #2, a low-power STA #3, and the like. The low-power STAs #1 to #3 may belong to coverage of the AP and may access the AP. The AP, the low-power STA #1, the low-power STA #2 and the low-power STA #3 may be the same as or similar to the low-power STA 500 of FIG. 5. Also, the AP, the low-power STA #1, the low-power STA #2 and the low-power STA #3 may further include a WUTx as compared to the low-power STA 500 of FIG. 5. Each of wake-up packets 2001, 2002 and 2003, WU-Poll frames 2005, data frames 2006, ACK frames 2007, LP operation request frames 2009, LP operation response frames 2010, a carrier sensing period and a transmitting waiting period of FIG. 20 may be configured to be the same as or similar to the wake-up packet 1701, the WU-Poll frame 1702, the data frame 1703, the ACK frame 1704, the LP operation request frame 1705, the LP operation response frame 1706, the carrier sensing period and the transmission waiting period of FIG. 17.

When there is data to be transmitted to the low-power STAs #1 to #3, the AP may generate the wake-up packets 2001, 2002 and 2003. The wake-up packets 2001, 2002 and 2003 may be configured to be the same as or similar to the wake-up packet shown in FIGS. 8 and 12 to 14. For example, each of the wake-up packets 2001, 2002 and 2003 may request each of the low-power STAs #1 to #3 to operate in the normal mode and may be modulated in the OOK manner. Each of the wake-up packets 2001, 2002 and 2003 may further include a Poll indicator, an MU indicator, and an indicator indicating a time point (T) at which the corresponding low-power STA operates in the normal mode. The Poll indicator of each of the wake-up packets 2001, 2002 and 2003 may indicate that transmission of the WU-Poll frame is required and the MU indicator of each of the wake-up packets 2001, 2002 and 2003 may indicate that each of the wake-up packets 2001, 2002 and 2003 is used for multi-user transmission. The low-power STAs #1 to #3 may operate in the normal mode at the same time by the indicator indicating the time point (T) at which the low-power STA operates in the normal mode. Therefore, waiting periods (e.g., a period from an operation time point of the normal mode to a reception time point of a trigger frame 2004) generated due to differences in reception time points of the wake-up packets 2001, 2002 and 2003 and mode transition times of the low-power STAs may be reduced, thereby reducing power consumption.

Here, the wake-up packet #1 2001 may be configured for the low-power STA #1, and a receiver address field of the wake-up packet #1 2001 may indicate the low-power STA #1. The wake-up packet #2 2002 may be configured for the low-power STA #2, and a receiver address field of the wake-up packet #2 2002 may indicate the low-power STA #2. The wake-up packet #3 2003 may be configured for the low-power STA #3, and a receiver address field of the wake-up packet #3 2003 may indicate the low-power STA #3.

The AP may transmit the wake-up packet #1 2001 to the low-power STA #1 when the channel state is idle during a predetermined period (e.g., carrier sensing period), transmit the wake-up packet #2 2002 to the low-power STA #2 after an xIFS from a transmission end time point of the wake-up packet #1 2001, and transmit the wake-up packet #3 2003 to the low-power STA #3 after an xIFS from a transmission end time point of the wake-up packet #2 2002. The xIFS may be an SIFS or an IFS (e.g., reduced IFS) that is shorter than the SIFS.

A WURx of the low-power STAs #1 to #3 operating in the WUR mode (e.g., PCR: sleep state, WURx: wake-up state) may perform a monitoring operation (e.g., carrier sensing operation) to receive each of the wake-up packets 2001, 2002 and 2003. When each of the wake-up packets 2001, 2002 and 2003 is received from the AP and a receiver address field of each of the wake-up packets 2001, 2002 and 2003 indicates each of the low-power STAs #1 to #3, the operation mode of the corresponding low-power STA may transition from the WUR mode to the normal mode. Here, wake-up times of the PCRs of the low-power STAs #1 to #3 may be different from each other.

Also, the low-power STAs #1 to #3 may confirm that the transmission of the WU-Poll frame is required based on the Poll indicators of the wake-up packets 2001, 2002 and 2003, and confirm that wake-up packets 2001, 2002 and 2003 are used for multi-user transmission based on the MU indicators of the wake-up packets 2001, 2002 and 2003. In this case, the low-power STAs #1 to #3 may wait for receiving the trigger frame #1 2004 after receiving the wake-up packets 2001, 2002 and 2003.

Also, the operation modes of the low-power STAs #1 to #3 may transition from the WUR mode to the normal mode in accordance with the operation time points of the normal mode indicated by the wake-up packets 2001, 2002 and 2003. In this case, the low-power STAs #1 to #3 may additionally perform low-power operations until the operation time points of the normal mode indicated by the wake-up packets 2001, 2002 and 2003.

When it is determined that all the low-power STAs #1 to #3 operate in the normal mode (e.g., when a transmission waiting period (e.g., mode transition time) elapses from a transmission end time point of the wake-up packet 2003), the AP may transmit the trigger frame #1 2004, which triggers the transmission of the WU-Poll frames 2005. The trigger frame #1 2004 may include information indicating an RU #1 allocated for transmission of the WU-Poll frame #1 of the low-power STA #1, information indicating an RU #2 allocated for transmission of the WU-Poll frame #2 of the low-power STA #2, and information indicating an RU #3 allocated for transmission of the WU-Poll frame #3 of the low-power STA #3.

Each of the RU #1, the RU #2 and the RU #3 may indicate a different frequency band (e.g., channel, subchannel) and may be mapped to an identifier of the low-power STA #1, an identifier of the low-power STA #2 or an identifier of the low-power STA #3. Also, the RU #1 may be used for transmission and reception procedures of the data frame #1 and the ACK frame #1 of the low-power STA #1, the RU #2 may be used for transmission and reception procedures of the data frame #2 and the ACK frame #2 of the low-power STA #2, and the RU #3 may be used for transmission and reception procedures of the data frame #3 and the ACK frame #3 of the low-power STA #3.

When the trigger frame 2004 is received from the AP, the low-power STAs #1 to #3 may identify allocated resources (e.g., RU #1, RU #2 and RU #3) based on the information included in the trigger frame 2004. The PCRs of the low-power STAs #1 to #3 may use the allocated resources (e.g., RU #1, RU #2 and RU #3) to transmit the WU-Poll frames (e.g., WU-Poll frame #1, WU-Poll frame #2, WU-Poll frame #3) to the AP. The WU-Poll frames 2005 may be transmitted after an SIFS from the reception end time point of the trigger frame #1 2004, and may be transmitted based on an orthogonal frequency division multiple access (OFDMA) scheme.

When the WU-Poll frames 2005 are received from the low-power STAs #1 to #3, the AP may determine that the low-power STAs #1 to #3 operate in the normal mode. Therefore, the AP may transmit the data frames 2006 to the low-power STAs #1 to #3 after an SIFS from the reception end time point of the WU-Poll frames 2005. The data frames 2006 may be transmitted based on the OFDMA scheme.

The PCRs of the low-power STAs #1 to #3 operating in the wake-up state may receive the data frames 2006 from the AP, and may transmit the ACK frames 2007, that are responses to the data frames 2006, to the AP when decoding operations on the data frames 2006 are completed successfully. The ACK frames 2007 may be transmitted based on the OFDMA scheme. Alternatively, the ACK frames 2007 may be a block ACK (BA) frame for the data frames 2006. The AP receiving the ACK frames 2007 may determine that the data frames 2006 have been successfully received at the low-power STAs #1 to #3.

Then, the AP may generate a trigger frame #2 2008, which triggers transmission of the LP operation request frames 2009. The trigger frame #2 2008 may include information indicating an RU #1 allocated for transmission of the LP operation request frame #1 of the low-power STA #1, information indicating an RU #2 allocated for transmission of the LP operation request frame #2 of the low-power STA #2, and information indicating an RU #3 allocated for transmission of the LP operation request frame #3 of the low-power STA #3.

Each of the RU #1, the RU #2 and the RU #3 indicated by the trigger frame #2 2008 may indicate a different frequency band (e.g., channel, subchannel) and may be mapped to an identifier of the low-power STA #1, an identifier of the low-power STA #2 or an identifier of the low-power STA #3. Also, the RU #1 may be used for transmission and reception procedures of the LP operation response frame #1 of the low-power STA #1, the RU #2 may be used for transmission and reception procedures of the LP operation response frame #2 of the low-power STA #2, and the RU #3 may be used for transmission and reception procedures of the LP operation response frame #3 of the low-power STA #3.

When the trigger frame 2008 is received from the AP, the PCRs of the low-power STAs #1 to #3 may use the allocated resources (e.g., RU #1, RU #2 and RU #3) to transmit the LP operation request frames 2009. The LP operation request frame #1 may request approval of the WUR mode operation of the low-power STA #1, the LP operation request frame #2 may request approval of the WUR mode operation of the low-power STA #2, and the LP operation request frame #3 may request approval of the WUR mode operation of the low-power STA #3. The LP operation request frames 2009 may be transmitted after an SIFS from the reception end time point of the trigger frame #2 2008 and may be transmitted based on the OFDMA scheme.

The AP receiving the LP operation request frames 2009 may transmit the LP operation response frames 2010 as responses to the LP operation request frames 2009 to the low-power STAs #1 to #3 when there are no data to be transmitted to the low-power STAs #1 to #3. The LP operation response frame #1 may indicate that the WUR mode operation of the low-power STA #1 is approved, the LP operation response frame #2 may indicate that the WUR mode operation of the low-power STA #2 is approved, and the LP operation response frame #3 may indicate that the WUR mode operation of the low-power STA #3 is approved. The LP operation response frames 2010 may be transmitted after an SIFS from the reception end time point of the LP operation request frames 2009 and may be transmitted based on the OFDMA scheme.

The LP operation response frame #1, which is a response to the LP operation request frame #1, may be transmitted using the RU #1 indicated by the trigger frame 2008, the LP operation response frame #2, which is a response to the LP operation request frame #2, may be transmitted using the RU #2 indicated by the trigger frame 2008, and the LP operation response frame #3, which is a response to the LP operation request frame #3, may be transmitted using the RU #3 indicated by the trigger frame 2008. The low-power STAs #1 to #3 receiving the LP operation response frames may operate in the WUR mode and the AP transmitting the LP operation response frames may determine the low-power STAs #1 to #3 operate in the WUR mode.

Meanwhile, when the AP provides communication services to a plurality of low-power STAs, the wake-up packet for the plurality of low-power STAs may be transmitted in a broadcast manner or a multicast manner.

Figure 21:
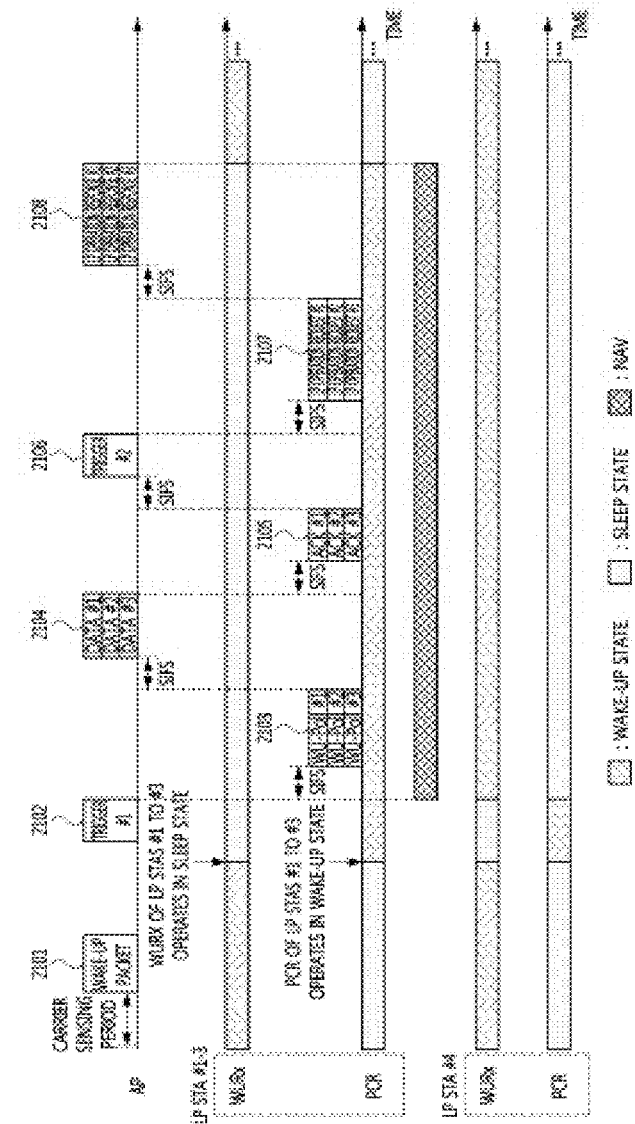
FIG. 21 is a timing chart illustrating an eighth embodiment of an operation method of a communication node in a WLAN based communication system.

FIG. 21 is a timing chart illustrating an eighth embodiment of an operation method of a communication node in a WLAN based communication system.

Referring to FIG. 21, a WLAN based communication system may include an AP, a low-power STA #1, a low-power STA #2, a low-power STA #3, a low-power STA #4, and the like. The low-power STAs #1 to #4 may belong to coverage of the AP and may access the AP. The AP, the low-power STA #1, the low-power STA #2, the low-power STA #3 and the low-power STA #4 may be the same as or similar to the low-power STA 500 of FIG. 5. Also, the AP, the low-power STA #1, the low-power STA #2, the low-power STA #3 and the low-power STA #4 may further include a WUTx as compared to the low-power STA 500 of FIG. 5.

Each of a wake-up packet 2101, trigger frames 2102 and 2106, WU-Poll frames 2103, data frames 2104, ACK frames 2105, LP operation request frames 2107, LP operation response frames 2108, a carrier sensing period and a transmitting waiting period of FIG. 21 may be configured to be the same as or similar to the wake-up packets 2001, 2002 and 2003, the trigger frames 2004 and 2008, the WU-Poll frame 2005, the data frame 2006, the ACK frame 2007, the LP operation request frame 2009, the LP operation response frame 2010, the carrier sensing period and the transmission waiting period of FIG. 20.

When there is data to be transmitted to the low-power STAs #1 to #3, the AP may generate the wake-up packet 2101. The wake-up packet 2101 may be configured to be the same as or similar to the wake-up packet shown in FIGS. 8 and 12 to 14. For example, the wake-up packet 2101 may request the low-power STAs to operate in normal mode and may be modulated in the OOK manner. The wakeup packet 2101 may further include a Poll indicator and an MU indicator. The Poll indicator of the wake-up packet 2101 may indicate that transmission of the WU-Poll frame is required and the MU indicator of the wake-up packet 2101 may indicate that the wake-up packet 2101 is used for multi-user transmission.

When the wakeup packet 2101 is transmitted in a broadcast manner, the receiver address field of the wake-up packet 2101 may indicate that the wake-up packet 2101 is transmitted in a broadcast manner. For example, the receiver address field included in the wake-up packet 2101 may include a broadcast identifier (e.g., a broadcast MAC address, a broadcast AID, or a broadcast PAID). When the wake-up packet 2101 is transmitted in a multicast manner, the wake-up packet 2101 may include a multicast identifier (e.g., a multicast MAC address, a multicast AID, a multicast PAID, or a group ID) indicating the low-power STAs #1 to #3 at which the data frames 2104 are to be received. The AP may transmit the wake-up packet 2101 in a broadcast manner or a multicast manner when the channel state is idle during a predetermined period (e.g., carrier sensing period).

The WURx of the low-power STAs #1 to #4 operating in the WUR mode (e.g., PCR: sleep state, WURx: wake-up state) may perform a monitoring operation (e.g., carrier sensing operation) to receive the wake-up packet 2101. When the wake-up packet 2101 is received from the AP as transmitted in the broadcast manner, the operation modes of all the low-power STAs #1 to #4 belonging to the coverage of the AP may transition from the WUR mode to the normal mode. When the wake-up packet 2101 is received from the AP as including the multicast identifier indicating the low-power STAs #1 to #3, the operation mode of the low-power STAs #1 to #3 may transition from the WUR mode to the normal mode. On the other hand, the low-power STA #4 which is not indicated by the multicast identifier included in the wake-up packet 2101 may maintain the WUR mode.

Also, the low-power STAs may confirm that the transmission of the WU-Poll frame is required based on the Poll indicator of the wake-up packet 2101, and confirm that wake-up packet 2101 is used for multi-user transmission based on the MU indicator of the wake-up packet 2101. Therefore, the low-power STAs may wait for receiving the trigger frame #1 2102 after receiving the wake-up packet 2101.

When it is determined that the low-power STAs #1 to #3 operate in the normal mode (e.g., when a transmission waiting period (e.g., mode transition time) elapses from the transmission end time point of the wake-up packet 2101), the AP may transmit the trigger frame #1 2102, which triggers the transmission of the WU-Poll frames 2103. The trigger frame #1 2102 may include identifiers (e.g., MAC address, AID or PAID) of the respective low-power STAs #1 to #3 at which the data frame 2104 is to be received, information indicating an RU #1 allocated for transmission of the WU-Poll frame #1 2103 of the low-power STA #1, information indicating an RU #2 allocated for transmission of the WU-Poll frame #2 2013 of the low-power STA #2, and information indicating an RU #3 allocated for transmission of the WU-Poll frame #3 2103 of the low-power STA #3.

Each of the RU #1, the RU #2 and the RU #3 may indicate a different frequency band (e.g., channel, subchannel) and may be mapped to the identifier of the low-power STA #1, the identifier of the low-power STA #2 or the identifier of the low-power STA #3. Also, the RU #1 may be used for transmission and reception procedures of the data frame #1 2104 and the ACK frame #1 2105 of the low-power STA #1, the RU #2 may be used for transmission and reception procedures of the data frame #2 2104 and the ACK frame #2 2105 of the low-power STA #2, and the RU #3 may be used for transmission and reception procedures of the data frame #3 2104 and the ACK frame #3 2105 of the low-power STA #3.

When the trigger frame #1 2102 is received from the AP and the identifiers included in the trigger frame #1 2102 indicate the low-power STAs #1 to #3, the low-power STAs #1 to #3 may use the allocated resources (e.g., RU #1, RU #2 and RU #3) indicated by the trigger frame #1 2102 to transmit the WU-Poll frames 2103. The WU-Poll frames 2103 may be transmitted after an SIFS from the reception end time point of the trigger frame #1 2102, and may be transmitted based on the OFDMA scheme. On the other hand, the low-power STA #4 receiving the wake-up packet 2101 transmitted in the broadcast manner may receive the trigger frame #1 2102 from the AP, and operate in the WUR mode because the identifiers included in the received trigger frame #1 2102 do not indicate the low-power STA #4. That is, after receiving the trigger frame #1 2102, the operation mode of the low-power STA #4 may transition from the normal mode to the WUR mode.

Here, after the transmission and reception of the trigger frame #1 2102 are completed, transmission and reception procedures of the WU-Poll frames 2103, the data frames 2104, the ACK frames 2105, the trigger frame #2 2106, the LP operation request frames 2107 and the LP operation response frames 2108 may be performed. The transmission and reception procedures of the WU-Poll frames 2103, the data frames 2104, the ACK frames 2105, the trigger frame #2 2106, the LP operation request frames 2107 and the LP operation response frames 2108 may be performed identically or similarly to those of the WU-Poll frame 2005, the data frame 2006, the ACK frame 2007, the trigger frame #2 2008, the LP operation request frame 2009 and the LP operation response frame 2010 as shown in FIG. 17.

A Leave Frame Indicating that the Low-Power STA is Located Outside the Coverage of the AP Since the transmission range of the legacy preamble 911 of the wake-up packet 910 is shorter than the transmission range of the WUR PPDU 912 of the wake-up packet 910 in the WLAN based communication system shown in FIG. 10, the low-power STA located outside the coverage of the AP may receive the WUR PPDU 912 from the AP.

However, even when the WUR PPDU 912 is successfully received, the transmission and reception procedure of the legacy frame between the low-power STA and the AP may not be performed because the low-power STA is located outside the coverage of the AP. In this case, the low-power STA may transmit a leave frame to the AP indicating that the low-power STA is located outside the coverage of the AP. The transmission and reception procedure of the leave frame may be performed as follows.

Figure 22:
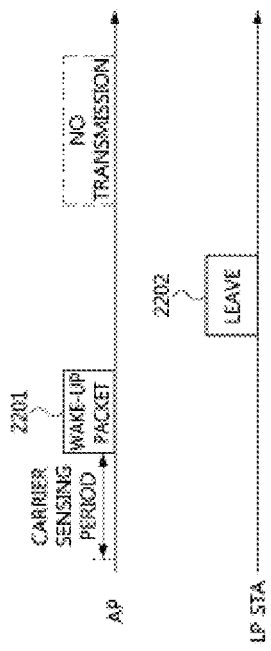
FIG. 22 is a timing chart illustrating a ninth embodiment of an operation method of a communication node in a WLAN based communication system.

FIG. 22 is a timing chart illustrating a ninth embodiment of an operation method of a communication node in a WLAN based communication system.

Referring to FIG. 22, a WLAN based communication system may include an AP, a low-power STA, and the like. The low-power STA may be located outside the coverage of the AP. For example, when a wake-up packet 2201 includes a legacy preamble and a WUR PPDU, the low-power STA may be located within a transmission range of the WUR PPDU of the wake-up packet 2201, and may be located outside a transmission range of the legacy preamble of the wake-up packet 2201. The AP and the low-power STA may be the same as or similar to the low-power STA 500 of FIG. 5. Also, the AP and the low-power STA may further include a WUTx as compared to the low-power STA 500 of FIG. 5. The AP and the low-power STA may operate based on the EDCA scheme shown in FIG. 3.

The AP may transmit the wake-up packet 2201 when the channel state is determined to be idle during the carrier sensing period. Each of the carrier sensing period and the wake-up packet 2201 may be configured to be the same as or similar to the carrier sensing period and the wake-up packet 1501 shown in FIG. 15. The wake-up packet 2201 may further include information of a transmission power of the wake-up packet 2201 and the information of the transmission power may be included in a MAC header or a frame body of the wake-up packet 2201. Alternatively, the information of the transmission power of the wake-up packet 2201 may be signaled to the low-power STA in the procedure shown in FIG. 7. For example, the information of the transmission power of the wake-up packet 2201 may be included in the LP support response frame 702 or the association response frame as shown in FIG. 7.

Since the low-power STA is located within the transmission range of the WUR PPDU of the wake-up packet 2201, the low-power STA may receive the WUR PPDU of the wake-up packet 2201, and identify the information (e.g., the information of the transmission power) included in the WUR PPDU of the wake-up packet 2201. The low-power STA may identify a difference (e.g., path loss) between the transmission power of the wake-up packet 2201 and the received signal strength of the wake-up packet 2201, and based on the identified difference, the low-power STA may determine whether it is located within the coverage of the AP. For example, when the difference between the transmission power and the received signal strength of the wake-up packet 2201 is below a predetermined threshold, the low-power STA may determine that the low-power STA is located within the coverage of the AP. On the other hand, when the difference between the transmission power and the received signal strength of the wake-up packet 2201 is equal to or greater than the predetermined threshold, the low-power STA may determine that the low-power STA is located outside the coverage of the AP.

Alternatively, the low-power STA may determine based on the received signal strength of the wake-up packet 2201 whether the low-power STA is located outside the coverage of the AP. For example, when the received signal strength of the wake-up packet 2201 is greater than or equal to a predetermined threshold, the low-power STA may determine that the low-power STA is located within the coverage of the AP. On the other hand, when the received signal strength of the wake-up packet 2201 is below the predetermined threshold, the low-power STA may determine that the low-power STA is located outside the coverage of the AP.

Alternatively, the low-power STA may determine whether the low-power STA is located outside the coverage of the AP based on sequence numbers of frames received from the AP. For example, when the sequence numbers of the frames received from the AP are consecutive, the low-power STA may determine that the low-power STA is located within the coverage of the AP. On the other hand, when the sequence numbers of the frames received from the AP are not consecutive, the low-power STA may determine that the low-power STA is located outside the coverage of the AP.

When it is determined that the low-power STA is located outside the coverage of the AP, the low-power STA may generate a leave frame 2202 indicating that the low-power STA is located outside the coverage of the AP. That is, when it is determined that the low-power STA is located outside the coverage of the AP, the low-power STA may transmit the leave frame 2202 to the AP instead of the WU-Poll frame. A format of the leave frame 2202 may be the same as or similar to the format of the wake-up packet 2201. For example, the leave frame 2202 may be configured to be the same as the wake-up packet 800 shown in FIG. 8, may be modulated based on the OOK scheme, and may include a leave indicator indicating that the low-power STA is located outside the coverage of the AP. The leave indicator may be included in a MAC header or a frame body of the leave frame 2202, and may have a size of 1 bit. For example, a leave indicator set to '0' may indicate that the low-power STA is located within the coverage of the AP, and a leave indicator set to '1' may indicate that the low-power STA is located outside the coverage of the AP.

The low-power STA may transmit the leave frame 2202 to the AP when the channel state is determined to be idle during the carrier sensing period. The carrier sensing period for the leave frame 2202 may be SIFS, PIFS, 'DIFS+backoff period', 'AIFS [AC_VO]+backoff [AC_VO] period', 'AIFS [AC_VI]+backoff [AC_VI] period', 'AIFS [AC_BE]+backoff [AC_BE] period' or 'AIFS [AC_BK]+backoff [AC_BK] period' as shown in FIG. 3. The leave frame 2202 may be transmitted by the PCR of the low-power STA, and the operation state of the PCR of the low-power STA may transition from the sleep state to the wake-up state for transmission of the leave frame 2202. After the transmission of the leave frame 2202 is completed, the operation state of the PCR of the low-power STA may transition from the wake-up state to the sleep state. Alternatively, when the low-power STA includes a WUTx, the leave frame 2202 may be transmitted by the WUTx of the low-power STA.

The AP may receive the leave frame 2202 from the low-power STA and may determine that the low-power STA is located outside the coverage of the AP based on the leave indicator included in the leave frame 2202. Thus, the AP may not transmit a data frame to the low-power STA. Also, the AP may delete information (e.g., context information) of the low-power STA stored in the AP and may release the association with the low-power STA.

On the other hand, when it is determined that the low-power STA is located outside the coverage of the AP and the received signal strength of the wake-up packet received from another AP is equal to or greater than a predetermined threshold, the operation state of the PCR of the low-power STA may transition from the sleep state to the wake-up state in order to discover another AP. The PCR operating in the wake-up state may perform a discovery operation for other APs. In this case, the WURx of the low-power STA may provide information of other APs (e.g., MAC address, BSS ID, service set identifier (SSID), etc.) to the PCR of the low-power STA, and the PCR of the low-power STA may quickly perform the discovery operation based on the information of the other APs obtained from the WURx of the low-power STA.

Alive Timer Based Operation Method of a Communication Node

In a WLAN based communication system, an alive timer may be used to determine whether the low-power STA is located within the coverage of the AP. An initial value of the alive timer may be 0, and an end value of the alive timer may be represented by the number of slots. The end value of the alive timer may be set by the AP and may be shared by the AP and the low-power STA. The end value of the alive timer may be signaled to the low-power SAT in the procedure shown in FIG. 7. For example, the end value of the alive timer may be included in the LP support response frame 702 or the association response frame of FIG. 7. Alternatively, the end value of the alive timer may be signaled to the low-power STA via the wake-up packet (or, an alive frame). The operation method of the communication node based on the alive timer may be as follows.

Figure 23:
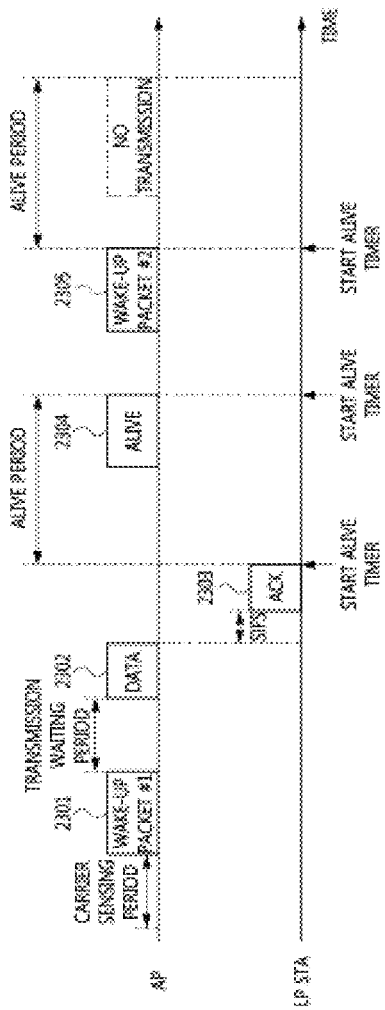
FIG. 23 is a timing chart illustrating a tenth embodiment of an operation method of a communication node in a WLAN based communication system.

FIG. 23 is a timing chart illustrating a tenth embodiment of an operation method of a communication node in a WLAN based communication system.

Referring to FIG. 23, a WLAN based communication system may include an AP, a low-power STA, and the like. The AP and the low-power STA may be the same as or similar to the low-power STA 500 of FIG. 5. Also, the AP and the low-power STA may further include a WUTx as compared to the low-power STA 500 of FIG. 5.

A transmission and reception procedure of a data frame 2302 between the AP and the low-power STA may be performed. Here, transmission and reception procedures of each of an wake-up packet #1 2301, the data frame 2302, and an ACK frame 2303 are the same as or similar to those of the wake-up packet 1501, the data frame 1502 and the ACK frame 1503 shown in FIG. 15. The wake-up packet #1 2301 may include the end value of the alive timer.

When the transmission and reception procedure of the data frame 2302 is completed, each of the AP and the low-power STA may start the alive timer at the end time point of the ACK frame 2303. When there is no data to be transmitted to one or more low-power STAs in a period corresponding to the end value of the alive timer (hereinafter referred to as 'alive period'), the AP may transmit an alive frame 2304 before the end of the alive period. Alternatively, the wake-up packet may be transmitted instead of the alive frame 2304 before the end of the period corresponding to the end value of the alive timer. In this case, the wake-up packet may perform the same function as the alive frame 2304. That is, since the low-power STA determines that the low-power STA is located outside the coverage of the AP when a signal (e.g., frame) is not received from the AP during the alive period, the AP may transmit a signal (e.g., frame) before the end of the alive period.

The alive frame 2304 may be transmitted to the low-power STA in a unicast manner. Alternatively, the alive frame 2304 may be transmitted in a broadcast or multicast manner. Thus, all low-power STAs located within the coverage of the AP may receive the alive frame 2304. A format of the alive frame 2304 may be the same as or similar to the format of the wake-up packet 800 (e.g., WUR PPDU 820) shown in FIG. 8. The alive frame 2304 may include the end value of the alive timer, and the end value of the alive timer included in the alive frame 2304 may be different from the end value of the alive timer included in the wake-up packet #1 2301.

Here, when the end value of the alive timer is set to 20, the alive period may be a period corresponding to 20 slots. When the alive timer starts, the value of the alive timer may be increased from 0 by 1, and when the value of the alive timer reaches the end value (e.g., 20), the alive timer may be terminated.

When the low-power STA is located within the coverage of the AP, the low-power STA may receive the alive frame 2304 (or, wake-up packet) from the AP, and when the alive frame 2304 (or, wake-up packet) is received, it may be determined that the low-power STA is located within the coverage of the AP. Also, even when a receiver address field of the alive frame 2304 (or, wake-up packet) indicates another low-power STA, the low-power STA may determine that the low-power STA is located within the coverage of the AP. In this case, the low-power STA may reset the current value of the alive timer. For example, at the reception end time point of the alive frame 2304 (or, wake-up packet), the low-power STA may set the value of the alive timer to 0 and restart the alive timer. Also, when the alive frame 2304 (or, wake-up packet) includes a new end value of the alive timer, the low-power STA may use the new end value of the alive timer.

Meanwhile, when there is data to be transmitted to the low-power STA, the AP may transmit a wake-up packet #2 2305 to the low-power STA, and resume the alive timer at the transmission end time point of the wake-up packet #2 2305. The low-power STA may receive the wake-up packet #2 2305 from the AP, and may resume the alive timer at the reception end time point of the wake-up packet #2 2305. Also, when the wake-up packet #2 2305 is received from the AP, the operation state of the low-power STA may transition from the WUR mode to the normal mode.

After transmission of the wake-up packet #2 2305, the AP may transmit a data frame (not shown) to the low-power STA. If the low-power STA moves out of the coverage of the AP after receiving the wake-up packet #2 2305, the low-power STA may not receive the data frame from the AP. For example, when a data frame (or trigger frame, alive frame, or wake-up packet) is not received from the AP during the alive period starting from the reception end time point of the wake-up packet #2 2305, the low-power STA may determine that the low-power STA is located outside the coverage of the AP.

When it is determined that the low-power STA is located outside the coverage of the AP, the low-power STA may another AP. For example, the operation state of the low-power STA operating in the WUR mode may transition to the normal mode, and the PCR of the low-power STA operating in the normal mode may perform a discovery operation for other APs. In this case, the WURx of the low-power STA may provide information of other APs (e.g., MAC address, BSS ID, SSID, etc.) to the PCR of the low-power STA, and the PCR of the low-power STA may quickly perform the discovery operation based on the information of other APs obtained from the WURx of the low-power STA.

Power Save Multi-Poll (PSMP) Procedure Based Operation Method of a Communication Node A PSMP procedure may be used in a WLAN based communication system.

Figure 24:
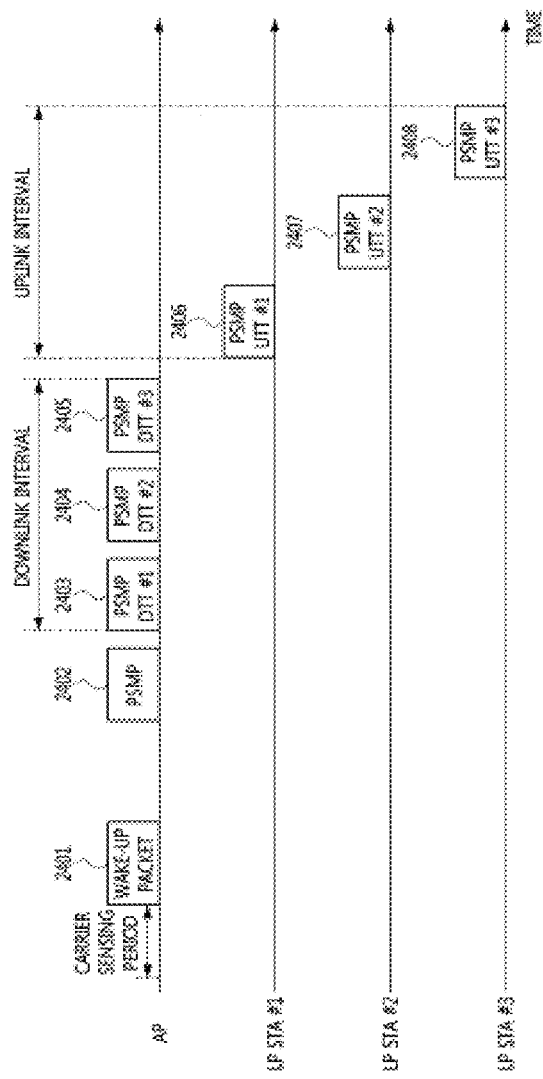
FIG. 24 is a timing chart illustrating an eleventh embodiment of an operation method of a communication node in a WLAN based communication system.

FIG. 24 is a timing chart illustrating an eleventh embodiment of an operation method of a communication node in a WLAN based communication system.

Referring to FIG. 24, a WLAN based communication system may include an AP, a low-power STA #1, a low-power STA #2, a low-power STA #3, and the like. The low-power STAs #1 to #3 may belong to coverage of the AP and may access the AP. The AP, the low-power STA #1, the low-power STA #2 and the low-power STA #3 may be the same as or similar to the low-power STA 500 of FIG. 5. Also, the AP, the low-power STA #1, the low-power STA #2 and the low-power STA #3 may further include a WUTx as compared to the low-power STA 500 of FIG. 5. The AP and the low-power STAs #1 to #3 may operate based on the EDCA scheme shown in FIG. 3. Each of a wake-up packet 2401 and a carrier sensing period in FIG. 24 may be configured to be the same as or similar to the wake-up packet 1501 and the carrier sensing period in FIG. 15.

When there are data to be transmitted to the low-power STAs #1 to #3 and the low-power STAs #1 to #3 support the PSMP procedure, the AP may generate the wake-up packet 2401, and transmit the wake-up packet 2401 when the channel state is determined to be idle during a predetermined period (e.g., carrier sensing period). The wake-up packet 2401 may be transmitted to the low-power STAs #1 to #3 in a broadcast manner or a multicast manner. The wake-up packet 2401 may include an indicator indicating that the PSMP procedure is to be performed. The indicator indicating that the PSMP procedure is to be performed may be included in a MAC header or a frame body of the wake-up packet 2401, and may be an identifier or a group identifier of the low-power STA participating in the PSMP procedure.

The WURx of the low-power STAs #1 to #3 operating in the WUR mode (e.g., PCR: sleep state, WURx: wake-up state) may perform a monitoring operation (e.g., carrier sensing operation) in order to receive the wake-up packet 2401, and receive the wake-up packet 2401 from the AP. When the wake-up packet 2401 is received from the AP, the operation mode of each of the low-power STAs #1 to #3 may transition from the WUR mode to the normal mode. Also, the low-power STAs #1 to #3 may determine that the PSMP procedure is performed based on the information included in the wake-up packet 2401.

When the low-power STAs #1 to #3 are determined to operate in the normal mode (e.g., when a transmission waiting period (e.g., mode transition time) has elapsed from the transmission end time point of the wake-up packet 2401), the AP may transmit a PSMP frame 2402 to the low-power STAs #1 to #3. The PSMP frame 2402 may include information indicating a downlink interval, information indicating PSMP downlink transmission times (DTTs) #1 to #3 (i.e., 2403, 2404 and 2405) in the downlink interval, information indicating an uplink interval, information indicating PSMP uplink transmission times (UTTs) #1 to #3 (i.e., 2406, 2407 and 2408) in the uplink interval, the number of low-power STAs participating in the PSMP procedure triggered by the PSMP frame 2402. Here, the PSMP DTT #1 2403 and the PSMP UTT #1 2406 may be configured for the low-power STA #1, the PSMP DTT #2 2404 and the PSMP UTT #2 2407 may be configured for the low-power STA #2, and the PSMP DTT #3 2405 and the PSMP UTT #3 2408 may be configured for the low-power STA #3. An interval between the PSMP DTTs 2403, 2404 and 2405 in the downlink interval may be RIFS or SIFS, and an interval between the PSMP UTTs 2406, 2407 and 2408 in the uplink interval may be RIFS or SIFS.

The low-power STAs #1 to #3 (e.g., the PCRs of the low-power STAs #1 to #3) operating in the normal mode may receive the PSMP frame 2402 from the AP, and may identify the information included in the PSMP frame 2402. For example, the low-power STAs #1 to #3 may identify the PSMP DTTs 2403, 2404 and 2405, and the PSMP UTTs 2406, 2407 and 2408.

In the PSMP DTT #1 2403, the AP may transmit a data frame to the low-power STA #1, and the low-power STA #1 may receive the data frame from the AP. In the PSMP UTT #1 2406, the low-power STA #1 may transmit a data frame to the AP, and the AP may receive a data frame from the low-power STA #1. Also, the low-power STA #1 may transmit an ACK frame, which is a response to the data frame received in the PSMP DTT #1 2403, in the PSMP UTT #1 2406.

The low-power STA #1 may operate in the WUR mode from the end time point of the PSMP DTT #1 2403 to the start time point of the PSMP UTT #1 2406. Alternatively, the PCR and WURx of the low-power STA #1 may all operate in the sleep state from the end time point of the PSMP DTT #1 2403 to the start time point of the PSMP UTT #1 2406. After the end of PSMP UTT #1 2406, the low-power STA #1 may operate in the WUR mode.

In the PSMP DTT #2 2404, the AP may transmit a data frame to the low-power STA #2, and the low-power STA #2 may receive the data frame from the AP. In the PSMP UTT #2 2407, the low-power STA #2 may transmit a data frame to the AP, and the AP may receive a data frame from the low-power STA #2. Also, the low-power STA #2 may transmit an ACK frame, which is a response to the data frame received in the PSMP DTT #2 2404, in the PSMP UTT #2 2407.

The low-power STA #2 may operate in the WUR mode from the end time point of the PSMP DTT #2 2404 to the start time point of the PSMP UTT #2 2407. Alternatively, the PCR and WURx of the low-power STA #2 may all operate in the sleep state from the end time point of the PSMP DTT #2 2404 to the start time point of the PSMP UTT #2 2407. After the end of PSMP UTT #2 2407, the low-power STA #2 may operate in the WUR mode.

In the PSMP DTT #3 2405, the AP may transmit a data frame to the low-power STA #3, and the low-power STA #3 may receive the data frame from the AP. In the PSMP UTT #3 2408, the low-power STA #3 may transmit a data frame to the AP, and the AP may receive a data frame from the low-power STA #3. Also, the low-power STA #3 may transmit an ACK frame, which is a response to the data frame received in the PSMP DTT #3 2405, in the PSMP UTT #3 2408.

The low-power STA #3 may operate in the WUR mode from the end time point of the PSMP DTT #5 2408 to the start time point of the PSMP UTT #3 2408. Alternatively, the PCR and WURx of the low-power STA #3 may all operate in the sleep state from the end time point of the PSMP DTT #3 2405 to the start time point of the PSMP UTT #3 2408. After the end of PSMP UTT #3 2408, the low-power STA #3 may operate in the WUR mode.

Unscheduled Automatic Power Save Delivery (U-APSD) Procedure Based Operation Method of a Communication Node A U-APSD procedure may be used in a WLAN based communication system.

Figure 25:
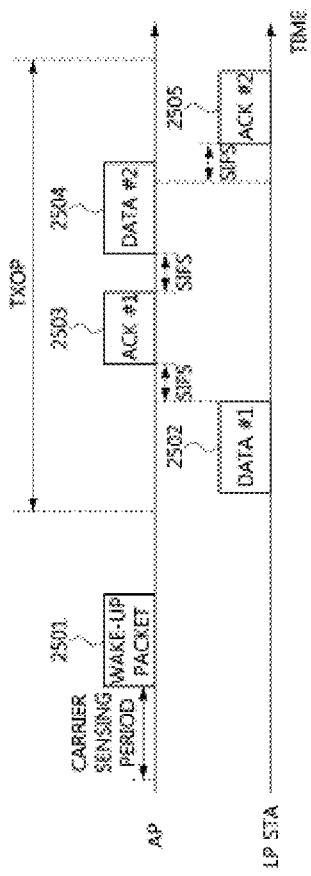
FIG. 25 is a timing chart illustrating a twelfth embodiment of an operation method of a communication node in a WLAN based communication system.

FIG. 25 is a timing chart illustrating a twelfth embodiment of an operation method of a communication node in a WLAN based communication system.

Referring to FIG. 25, a WLAN based communication system may include an AP, a low-power STA, and the like. The low-power STA may belong to coverage of the AP and may access the AP. The AP and the low-power STA may be the same as or similar to the low-power STA 500 of FIG. 5. Also, the AP and the low-power STA may further include a WUTx as compared to the low-power STA 500 of FIG. 5. The AP and the low-power STA may operate based on the EDCA scheme shown in FIG. 3. Each of a wake-up packet 2501 and a carrier sensing period in FIG. 25 may be configured to be the same as or similar to the wake-up packet 1501 and the carrier sensing period in FIG. 15.

When there is data to be transmitted to the low-power STA and the low-power STA supports the U-APSD procedure, the AP may generate the wake-up packet 2501, and transmit the wake-up packet 2501 to the low-power STA when the channel state is determined to be idle during a predetermined period (e.g., carrier sensing period). The wake-up packet 2501 may include an indicator indicating that the U-APSD procedure is to be performed, and the indicator indicating that the U-APSD procedure is to be performed may be an identifier or a group identifier of the low-power STA. The indicator indicating that the U-APSD procedure is to be performed may be included in a MAC header or a frame body of the wake-up packet 2501.

The low-power STA operating in the WUR mode (e.g., PCR: sleep state, WURx: wake-up state) may perform a monitoring operation (e.g., carrier sensing operation) to receive the wake-up packet 2501, and receive the wake-up packet 2501 from the AP. When the wake-up packet 2501 is received from the AP, the operation mode of the low-power STA may transition from the WUR mode to the normal mode. Also, the low-power STA may determine that the U-APSD procedure is performed based on the information included in the wake-up packet 2501.

The low-power STA (e.g., PCR of the low-power STA) operating in the normal mode may transmit a data frame #1 2502 to the AP that triggers the U-APSD procedure. Alternatively, the low-power STA may transmit a null data frame to the AP instead of the data frame #1 2502. When the data frame #1 2502 (or null data frame) is received from the low-power STA, the AP may determine that the U-APSD procedure is to be initiated and transmit an ACK frame #1 2503 for the data frame #1 2502 to the low-power STA after an SIFS from the reception end time point of the data frame #1 2502. Then, a transmission and reception procedure of data between the AP and the low-power STA may be performed in a TXOP configured by an uplink frame according to the U-APSD procedure. For example, the AP may transmit a data frame #2 2504 to the low-power STA through a Reverse Direction (RD) procedure after the transmission end time point of the ACK frame #1 2503. Alternatively, a null data frame may be transmitted to the low-power STA instead of the data frame #2 2504. The low-power STA may receive the data frame #2 2504 from the AP, and may transmit an ACK frame #2 2505 to the AP after an SIFS from the reception end time point of the data frame #2 2504. When the ACK frame #2 2505 is received from the low-power STA, the AP may determine that the data frame #2 2504 is successfully received at the low-power STA.

On the other hand, when the RD is not configured in the TXOP described above or the length of the TXOP is shorter than the time required for transmission of the data frame #2 2504, the AP may transmit the data frame #2 2504 by performing a separate channel access procedure instead of transmitting the data frame #2 2504 after an SIFS from the transmission end time point of the ACK frame #1 2503. Meanwhile, the low-power STA operating in the normal mode for more than a predetermined time (e.g., a time agreed to operate in the normal mode) may transition to the WUR mode after the end of the TXOP between the AP and the low-power STA. On the other hand, when a plurality of low-power STAs participate in the U-APSD procedure, the following problems may arise.

Figure 26:
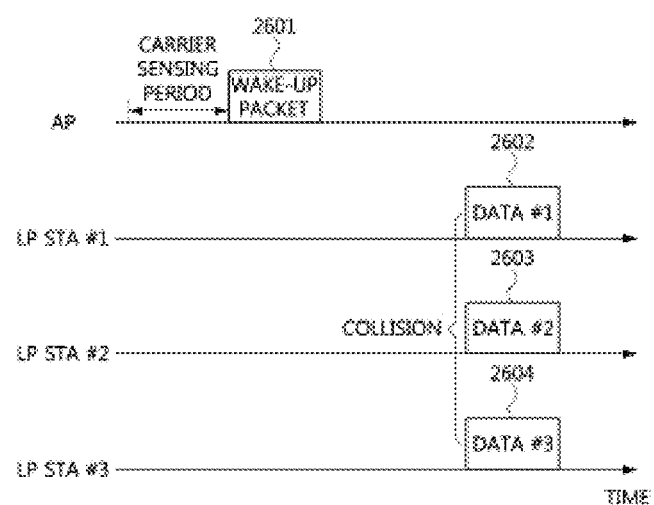
FIG. 26 is a timing chart illustrating a thirteenth embodiment of an operation method of a communication node in a WLAN based communication system.

FIG. 26 is a timing chart illustrating a thirteenth embodiment of an operation method of a communication node in a WLAN based communication system.

Referring to FIG. 26, a WLAN based communication system may include an AP, a low-power STA #1, a low-power STA #2, a low-power STA #3, and the like. The low-power STAs #1 to #3 may belong to coverage of the AP and may access the AP. The AP and the low-power STAs #1 to #3 may be the same as or similar to the low-power STA 500 of FIG. 5. Also, the AP, the low-power STA #1, the low-power STA #2 and the low-power STA #3 may further include a WUTx as compared to the low-power STA 500 of FIG. 5. The AP and the low-power STAs #1 to #3 may operate based on the EDCA scheme shown in FIG. 3. Each of a wake-up packet 2601 and a carrier sensing period in FIG. 26 may be configured to be the same as or similar to the wake-up packet 1501 and the carrier sensing period in FIG. 15.

When there are data to be transmitted to the low-power STAs #1 to #3 and the low-power STAs #1 to #3 support the U-APSD procedure, the AP may generate the wake-up packet 2601, and transmit the wake-up packet 2601 when the channel state is idle during a predetermined period (e.g. carrier sensing period). The wake-up packet 2601 may be transmitted to the low-power STAs #1 to #3 in a broadcast manner or a multicast manner. The wake-up packet 2601 may include an indicator indicating that the U-APSD procedure is to be performed, and the indicator indicating that the U-APSD procedure is to be performed may include an identifier or a group identifier of the low-power STA participating in the U-APSD procedure. The indicator indicating that the U-APSD procedure is to be performed may be included in a MAC header or a frame body of the wake-up packet 2601.

The low-power STAs #1 to #3 operating in the WUR mode (e.g., PCR: sleep state, WURx: wake-up state) may perform a monitoring operation (e.g., carrier sensing operation) to receive the wake-up packet 2601, and receive the wake-up packet 2601 from the AP. When the wake-up packet 2601 is received from the AP, the low-power STAs #1 to #3 may transition from the WUR mode to the normal mode. Also, the low-power STAs #1 to #3 may determine that the U-APSD procedure is performed based on the information included in the wake-up packet 2601.

The low-power STAs #1 to #3 (e.g., the PCRs of the low-power STAs #1 to #3) operating in the normal mode may transmit data frames #1 to #3 (i.e., 2602, 2603 and 2604) triggering the U-APSD procedure to the AP. The low-power STAs #1 to #3 may transmit the data frames #1 to #3 (i.e., 2602, 2603 and 2604) when the channel state is idle during a period (e.g., SIFS, DIFS, AIFS, etc. shown in FIG. 3) according to the EDCA scheme from the transition point of from the WUR mode to the normal mode. When the mode transition times of the low-power STAs #1 to #3 are similar, transmission of the data frames #1 to #3 (i.e., 2602, 2603 and 2604) may be collided. Therefore, the AP may not receive the data frames #1 to #3 (i.e., 2602, 2603, and 2604) from the low-power STAs #1 to #3, so that the U-APSD procedure may not be performed.

Self-NAV Based Operation Method of a Communication Node

A self-NAV may be used to solve the problem of FIG. 26 described above. A self-NAV value may be set by the low-power STA or the AP regardless of the duration field included in the frame. When the self-NAV value is set by the AP, the AP may inform the low-power STA of the set self-NAV value. For example, the self-NAV value may be signaled to the low-power STA through the procedure shown in FIG. 7. The self-NAV value may be set from the transition point from the WUR mode to the normal mode, and the self-NAV value may indicate a period from the transition point to the normal mode from the WUR mode to a specific point. The plurality of low-power STAs may have the same or different self-NAV values.

Figure 27:
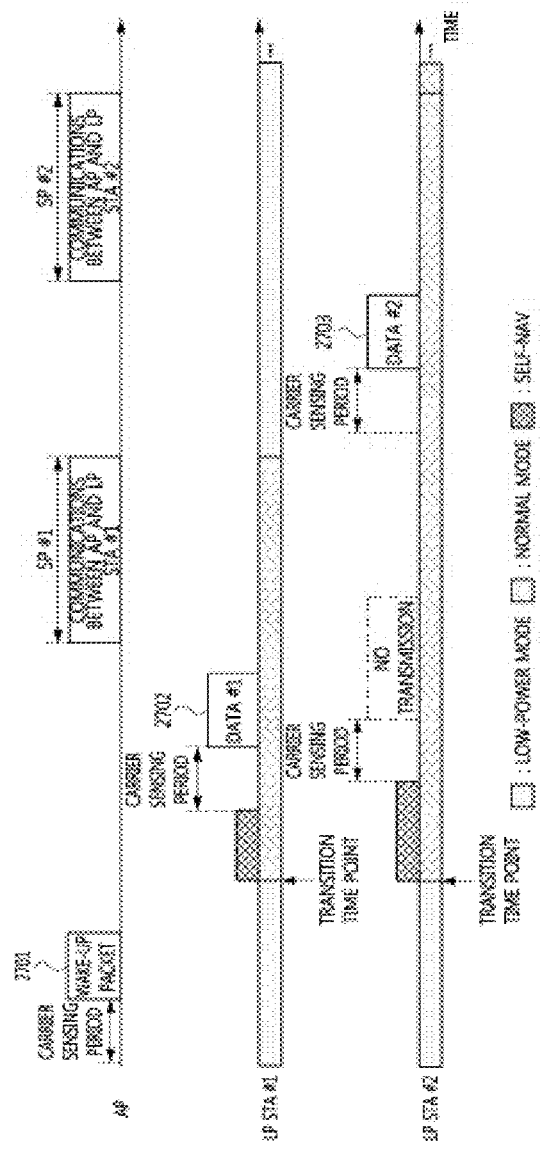
FIG. 27 is a timing chart illustrating a fourteenth embodiment of an operation method of a communication node in a WLAN based communication system.

FIG. 27 is a timing chart illustrating a fourteenth embodiment of an operation method of a communication node in a WLAN based communication system.

Referring to FIG. 27, a WLAN based communication system may include an AP, a low-power STA #1, a low-power STA #2, and the like. The low-power STAs #1 and #2 may belong to coverage of the AP and may access the AP. The AP, the low-power STA #1, and the low-power STA #2 may be the same or similar to the low-power STA 500 of FIG. 5. Also, the AP, the low-power STA #1, and the low-power STA #2 may further include a WUTx as compared to the low-power STA 500 of FIG. 5. The AP and the low-power STAs #1 to #2 may operate based on the EDCA scheme shown in FIG. 3. The mode transition time of the low-power STA #1 may be the same as the mode transition time of the low-power STA #2. Alternatively, the mode transition time of the low-power STA #1 may be different from the mode transition time of the low-power STA #2. Each of the wake-up packet 2701 and the carrier sensing period in FIG. 27 may be configured to be the same as or similar to the wake-up packet 1501 and the carrier sensing period in FIG. 15.

When there are data to be transmitted to the low-power STAs #1 to #2 and the low-power STAs #1 to #2 support the U-APSD procedure (or, the communication procedures based on the WU-Poll frame shown in FIGS. 17 to 21), the AP may generate the wake-up packet 2701, and transmit the wake-up packet 2701 when the channel state is determined to be idle during a predetermined period (e.g. carrier sensing period). The wake-up packet 2701 may be transmitted to the low-power STAs #1 to #2 in a broadcast manner or a multicast manner.

When the U-APSD procedure is performed, the wake-up packet 2701 may include an indicator indicating that the U-APSD procedure is to be performed. The indicator indicating that the U-APSD procedure is to be performed may be included in a MAC header or a frame body of the wake-up packet 2701. When the communication procedure based on the WU-Poll frame shown in FIGS. 17 to 21 is performed, the wake-up packet 2701 may include an indicator (e.g., Poll indicator) indicating that the communication procedure based on the WU-Poll frame is to be performed. The indicator (e.g., Poll indicator) indicating that the communication procedure based on the WU-Poll frame is to be performed may be included in a MAC header or a frame body of the wake-up packet 2701. Also, the wake-up packet 2701 may include a self-NAV value of each of the low-power STAs #1 and #2. The self-NAV value of the low-power STA #1 may be set to be different from the self-NAV value of the low-power STA #2. When the low-power STAs #1 and #2 know the self-NAV values, the self-NAV values may not be included in the wake-up packet 2701.

The low-power STAs #1 to #2 operating in the WUR mode (e.g., PCR: sleep state, WURx: wake-up state) may perform a monitoring operation (e.g., carrier sensing operation) to receive the wake-up packet 2701, and receive the wake-up packet 2701 from the AP. When the wake-up packet 2701 is received from the AP, the operation state of the low-power STA may transition from the WUR mode to the normal mode. Also, the low-power STA may determine that the U-APSD procedure (or, the communication procedure based on the WU-Poll frame) is performed based on the information included in the wake-up packet 2701.

The low-power STAs #1 and #2 may set the self-NAV at the transition time from the WUR mode to the normal mode, and perform carrier sensing operations in the carrier sensing period after the end time point of the self-NAV. The carrier sensing period after the end time point of the self-NAV may be SIFS, PIFS, 'DIFS+backoff period', 'AIFS [AC_VO]+ backoff [AC_VO] period', 'AIFS [AC_VI]+backoff [AC_VI] period', 'AIFS [AC_BE]+backoff [AC_BE] period' or 'AIFS [AC_BK]+backoff [AC_BK] period'.

The low-power STA #1 may transmit a data frame #1 2702 to the AP since the channel state is determined to be idle during the carrier sensing period after the self-NAV end point. The AP may receive a data frame #1 2702 from the low-power STA #1 and perform a U-APSD procedure (e.g., a communication procured between the AP and the low-power STA #1) triggered by the data frame #1 2702 in a SP #1. Alternatively, when the communication procedure based on the WU-Poll frame is performed, the low-power STA #1 may transmit a WU-Poll frame to the AP instead of the data frame #1 2702. The AP may receive the WU-Poll frame from the low-power STA #1 and may perform the communication procedure (e.g., the communication procedure between the AP and the low-power STA #1) triggered by the WU-Poll frame. When the communication procedure between the AP and the low-power STA #1 is terminated, the operation state of the low-power STA #1 may transition from the normal mode to the WUR mode.

Meanwhile, the low-power STA #2 may sense the data frame #1 2702 of the low-power STA #1 during the carrier sensing period after the end time point of the self-NAV, and when a received signal strength of the data frame #1 2702 is equal to or greater than a predetermined threshold, the low-power STA #2 may determine that the channel state is busy. When the channel state is busy during the carrier sensing period, the low-power STA #2 may stop the current backoff value (e.g., stop the random backoff procedure), and may not transmit a frame (e.g., data frame or WU-Poll frame) until the channel state becomes idle. Then, the low-power STA #2 may again perform a carrier sensing operation for frame transmission. For example, the low-power STA #2 may perform the carrier sensing operation again during a period corresponding to 'DIFS+a period corresponding to the stopped backoff value', or a period corresponding to 'AIFS+the period corresponding to the stopped backoff value'. When the channel state is idle in the carrier sensing period, the low-power STA #2 may transmit the data frame #2 2703 to the AP.

The AP may receive a data frame #2 2703 from the low-power STA #2 and perform the U-APSD procedure (e.g., communication procedure between the AP and the low-power STA #2) triggered by the data frame #2 2703 in an SP #2. Alternatively, when the communication procedure based on the WU-Poll frame is performed, the low-power STA #2 may transmit the WU-Poll frame to the AP instead of the data frame #2 2703. The AP may receive the WU-Poll frame from the low-power STA #2 and may perform the communication procedure (e.g., communication procedure between the AP and the low-power STA #2) triggered by the WU-Poll frame. When the communication procedure between the AP and the low-power STA #2 is terminated, the operation state of the low-power STA #2 may transition from the normal mode to the WUR mode.

Meanwhile, in the embodiment of FIG. 21 described above, the self-NAV may be used to guarantee transmission of the trigger frame #1 2102, and the operation method of the communication node based on the self-NAV may be as follows.

Figure 28:
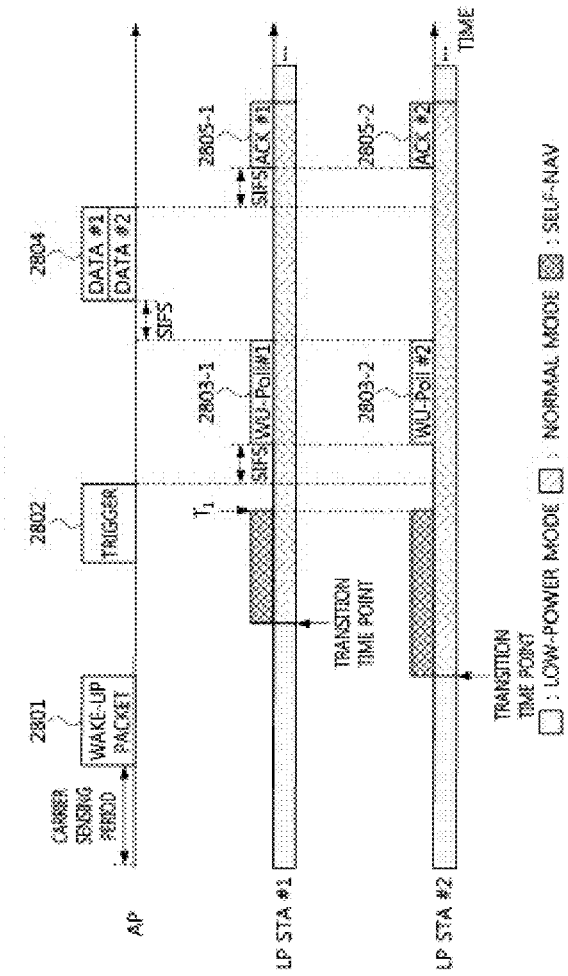
FIG. 28 is a timing chart illustrating a fifteenth embodiment of an operation method of a communication node in a WLAN based communication system.

FIG. 28 is a timing chart illustrating a fifteenth embodiment of an operation method of a communication node in a WLAN based communication system.

Referring to FIG. 28, a WLAN based communication system may include an AP, a low-power STA #1, a low-power STA #2, and the like. The low-power STAs #1 to #2 may belong to coverage of the AP and may access the AP. The AP, the low-power STA #1 and the low-power STA #2 may be the same or similar to the low-power STA 500 of FIG. 5. Also, the AP, the low-power STA #1 and the low-power STA #2 may further include a WUTx as compared to the low-power STA 500 of FIG. 5. The AP and the low-power STAs #1 to #2 may operate based on the EDCA scheme shown in FIG. 3. A mode transition time of the low-power STA #1 may be different from the mode transition time of the low-power STA #2. Each of a wake-up packet 2801, a trigger frame 2802 and a carrier sensing period in FIG. 28 may be configured to be the same as or similar to the wake-up packet 2101, the trigger frame #1 2102 and the carrier sensing period in FIG. 21.

When there are data to be transmitted to the low-power STAs #1 to #2, the AP may generate the wake-up packet 2801, and transmit the wake-up packet 2801 when the channel state is idle during a predetermined period (e.g. carrier sensing period). The wake-up packet 2801 may be transmitted to the low-power STAs #1 to #2 in a broadcast manner or a multicast manner. The wake-up packet 2801 may include a self-NAV value of each of the low-power STAs #1 and #2. The self-NAV value of each of the low-power STAs #1 and #2 may be determined so that the self-NAV is set up to T1. Therefore, the self-NAV value of the low-power STA #1 may indicate a period between the transition time from the WUR mode to the normal mode and T1, and the self-NAV value of the low-power STA #2 may indicate a period between the transition time from the WUR mode to the normal mode and T1. When the mode transition time of the low-power STA #1 is different from the mode transition time of the low-power STA #2, the self-NAV value of the low-power STA #1 may be different from the self-NAV value of the low-power STA #2. When the low-power STAs #1 and #2 know the self-NAV values, the self-NAV values may not be included in the wake-up packet 2801.

The low-power STAs #1 and #2 operating in the WUR mode (e.g., PCR: sleep state, WURx: wake-up state) may perform a monitoring operation (e.g., carrier sensing operation) to receive the wake-up packet 2801, and receive the wake-up packet 2801 from the AP. When the wake-up packet 2801 is received from the AP, the operation mode of the low-power STA may transition from the WUR mode to the normal mode. The low-power STAs #1 and #2 may set the self-NAV at the transition time from the WUR mode to the normal mode, and perform the carrier sensing operation in the carrier sensing period after the end of the self-NAV.

Meanwhile, since the transmission of the trigger frame 2802 is guaranteed by the self-NAV, when the channel state is idle during a predetermined interval (e.g., SIFS, DIFS), the AP may transmit the trigger frame 2802 without performing a random access procedure. For example, the trigger frame 2802 may be transmitted within a period of 'a period indicated by the self-NAV value+the carrier sensing period'. The low-power STAs #1 and #2 may receive the trigger frame 2802 from the AP and transmit the WU-Poll frames 2803-1 and 2803-2 using resources indicated by the trigger frame 2802. The transmission and reception procedures of the WU-Poll frames 2803-1 and 2803-2, the data frame 2804 and the ACK frames 2805-1 and 2805-2 may be the same as those of the WU-Poll frame 2103, the data frame 2104 and the ACK frame 2105 shown in FIG. 21.

Operation Method of AP Comprising PCR and WUTx

The AP may comprise a PCR and a WUTx, and each of the PCR and WUTx of the AP may operate independently. When each of the PCR and WUTx of the AP operates independently, the following problems may arise.

Figure 29:
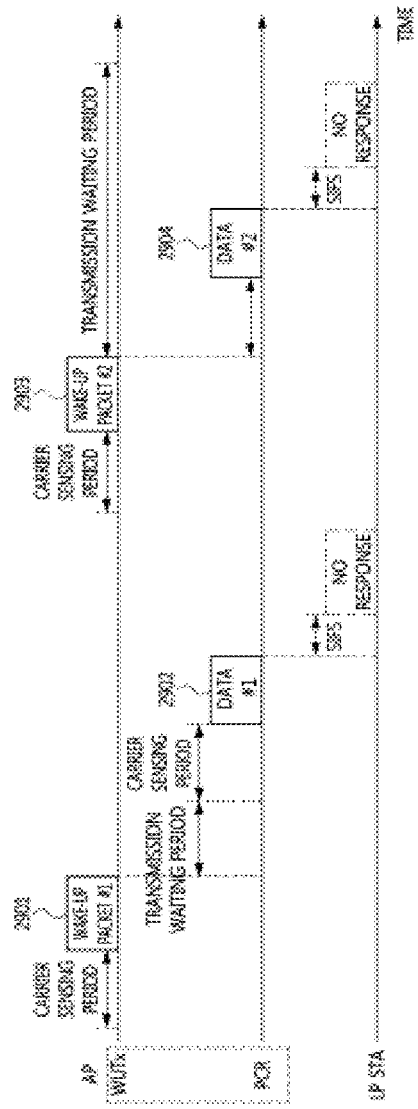
FIG. 29 is a timing chart illustrating a sixteenth embodiment of an operation method of a communication node in a WLAN based communication system.

FIG. 29 is a timing chart illustrating a sixteenth embodiment of an operation method of a communication node in a WLAN based communication system.

Referring to FIG. 29, a WLAN based communication system may include an AP, a low-power STA, and the like. The low-power STA may belong to coverage of the AP and may access the AP. The AP and the low-power STA may be the same as or similar to the low-power STA 500 of FIG. 5. Also, the AP and the low-power STA may further include a WUTx as compared to the low-power STA 500 of FIG. 5. The AP and the low-power STA may operate based on the EDCA scheme shown in FIG. 3.

When there is data to be transmitted to the low-power STA, the AP may generate a wake-up packet #1 2901, and transmit the wake-up packet 2901 to the low-power STA when the channel state is idle during a predetermined period (e.g., carrier sensing period). The wake-up packet #1 2901 may be transmitted by the WUTx of the AP. The wake-up packet #1 2901 may be configured to be the same as or similar to the wake-up packet shown in FIGS. 8 and 12-14. After a transmission waiting period from the end time point of the wake-up packet #1 2901, the PCR of the AP may transmit a data frame #1 2902 to the low-power STA.

On the other hand, the low-power STA may not receive the wake-up packet #1 2901 from the AP, in which case the operation state of the low-power STA may not transition from the WUR mode to the normal mode. That is, the low-power STA may continue to operate in the WUR mode. Thus, the low-power STA may not receive the data frame #1 2902 from the AP, and may not transmit a response (e.g., an ACK frame) for the data frame #1 2902 to the AP when the data frame #1 2902 is not received.

When no response is received from the low-power STA after transmission of the wake-up packet #1 2901, the WUTx of the AP may determine that the low-power STA has not transitioned from the WUR mode to the normal mode. Therefore, the WUTx of the AP may retransmit a wake-up packet #2 2903 to the low-power STA. Here, the wake-up packet #2 2903 may be the same as the wake-up packet #1 2901.

On the other hand, when a response to the data frame #1 2902 is not received from the low-power STA, the PCR of the AP may determine that the data frame #1 2902 has not been successfully received at the low-power STA. Thus, the PCR of the AP may retransmit a data frame #2 2904 to the low-power STA. Here, the data frame #2 2904 may be the same as the data frame #1 2901. Since a response to the data frame #2 2904 is not received from the low-power STA when the low-power STA operates in the WUR mode, the PCR of the AP may continue to perform the retransmission procedure of the data frame. The channel efficiency may be reduced because the channel is unnecessarily occupied by the retransmission procedure of the data frame. Also, since a contention window for a carrier sensing operation in the retransmission procedure of the data frame is twice a contention window for the carrier sensing operation in the previous transmission procedure of the data frame, the transmission of the data frame may be delayed due to the increased contention window.

In order to solve the above-described problem, the PCR of the AP may set a self-NAV. The operation method of the communication node based on the self-NAV may be as follows.

Figure 30:
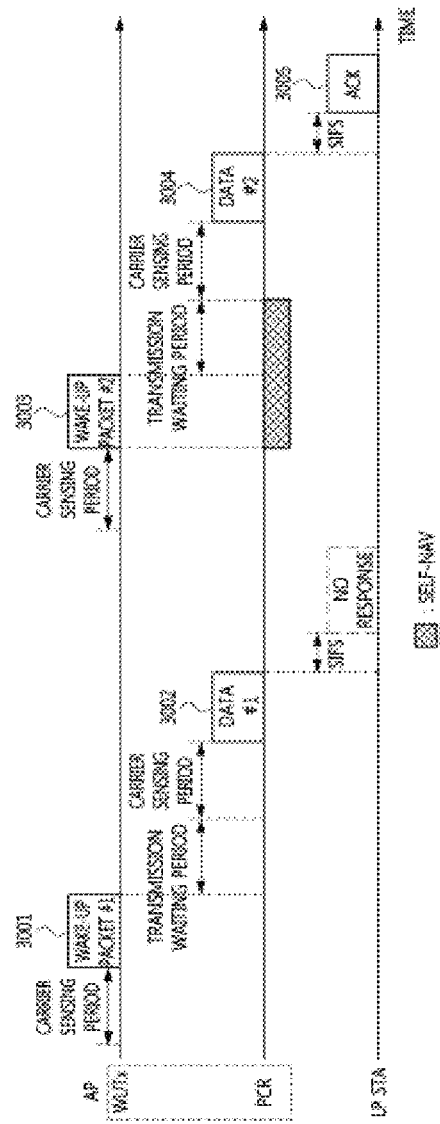
FIG. 30 is a timing chart illustrating a seventeenth embodiment of an operation method of a communication node in a WLAN based communication system. [Modes of the Invention]

FIG. 30 is a timing chart illustrating a seventeenth embodiment of an operation method of a communication node in a WLAN based communication system.

Referring to FIG. 30, a WLAN based communication system may include an AP, a low-power STA, and the like. The low-power STA may belong to coverage of the AP and may access the AP. The AP and the low-power STA may be the same as or similar to the low-power STA 500 of FIG. 5. Also, the AP and the low-power STA may further include a WUTx as compared to the low-power STA 500 of FIG. 5. The AP and the low-power STA may operate based on the EDCA scheme shown in FIG. 3.

When there is data to be transmitted to the low-power STA, the AP may generate a wake-up packet #1 3001, and transmit the wake-up packet 3001 to the low-power STA when the channel state is idle during a predetermined period (e.g., carrier sensing period). The wake-up packet #1 3001 may be transmitted by the WUTx of the AP. The wake-up packet #1 3001 may be configured to be the same as or similar to the wake-up packet shown in FIGS. 8 and 12-14. After a transmission waiting period from the end time point of the wake-up packet #1 3001, the PCR of the AP may transmit a data frame #1 3002 to the low-power STA.

On the other hand, the low-power STA may not receive the wake-up packet #1 3001 from the AP, in which case the operation state of the low-power STA may not transition from the WUR mode to the normal mode. That is, the low-power STA may continue to operate in the WUR mode. Thus, the low-power STA may not receive the data frame #1 3002 from the AP, and may not transmit a response (e.g., an ACK frame) for the data frame #1 3002 to the AP when the data frame #1 3002 is not received.

When no response is received from the low-power STA after transmission of the wake-up packet #1 3001, the WUTx of the AP may determine that the low-power STA has not transitioned from the WUR mode to the normal mode. Also, when no response to the data frame #1 3002 is received from the low-power STA, the PCR of the AP may determine that data frame #1 3002 has not been successfully received at the low-power STA, and may set a self-NAV. Since that no response to the data frame #1 3002 is received from the low-power STA may indicate that the low-power STA does not operate in the normal mode, the self-NAV may be set to prevent the retransmission of the data frame until the low-power STA operates in the normal mode. For example, the self-NAV for the PCR of the AP may be set up until the end time point of the transmission waiting period according to the wake-up packet #2 3003. Since the retransmission of the data frame is prevented by the self-NAV, the occupation of the channel by the unnecessary data frame may be prevented.

When it is determined that the low-power STA does not operate in the normal mode, the WUTx of the AP may retransmit a wake-up packet #2 3003 to the low-power STA. Here, the wake-up packet #2 3003 may be the same as the wake-up packet #1 3001. When it is confirmed that the wake-up packet #2 3003 has been retransmitted, the PCR of the AP may transmit a data frame #2 3004 to the low-power STA after a transmission waiting period from the end time point of the wake-up packet #2 3003.

Meanwhile, when the wake-up packet #2 3003 is received from the AP, the operation state of the low-power STA may transition from the WUR mode to the normal mode. The PCR of the low-power STA operating in the normal mode may receive the data frame #2 3004 from the AP, and transmit an ACK frame 3005, which is a response to the data frame #2 3004, to the AP. When the ACK frame 3005 is received from the low-power STA, the AP may determine that the data frame #2 3004 has been successfully received at the low-power STA.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. An operation method of an access point (AP) in a wireless local area network (WLAN), the operation method comprising:

receiving, from a first station (STA), information indicating a first transition time, the first STA including a transceiver and a receiver, and the first transition time being a time required for the transceiver of the first STA to transit from a doze state to an awake state after a reception of a first wake-up radio (WUR) wake-up frame;

receiving, from a second STA, information indicating a second transition time, the second STA including a transceiver and a receiver, and the second transition time being a time required for the transceiver of the second STA to transit from the doze state to the awake state after a reception of a second WUR wake-up frame;

transmitting, to the first STA, the first WUR wake-up frame;

transmitting, to the second STA, the second WUR wake-up frame after transmitting the first WUR wake-up frame; and transmitting, to the first and second STAs, a first frame for soliciting transmissions by the first and second STAs, the first frame being transmitted after an expiration of both the first transition time and the second transition time.

2. The operation method of claim 1, wherein a transmission interval between the first WUR wake-up frame and the second WUR wake-up frame is an inter-frame space (IFS) which is shorter than or equal to a short inter-frame space (SIFS).

3. The operation method of claim 1, wherein the first frame is a trigger frame used for triggering the transmissions.

4. The operation method of claim 1, wherein the first frame includes information on a first resource unit (RU) allocated for transmission of a first response frame by the first STA and information on a second RU allocated for transmission of a second response frame by the second STA, and the first RU and the second RU are multiplexed in a frequency domain.

5. The operation method of claim 4, wherein the first RU is mapped to an identifier of the first STA, and the second RU is mapped to an identifier of the second STA.

6. The operation method of claim 4, further comprising transmitting, to the first and second STAs, a first data frame and a second data frame based on a scheme of MU transmissions after transmitting the first frame.

7. The operation method of claim 6, wherein the first data frame and a first acknowledgement (ACK) in response to the first data frame are transmitted using the first RU, and the second data frame and a second ACK in response to the second data frame are transmitted using the second RU.

8. The operation method of claim 6, further comprising receiving a first response frame in response to the first frame from the first STA and receiving a second response frame in response to the first frame from the second STA,
wherein the first data frame is transmitted after receiving the first response frame and the second data frame is transmitted after receiving the second response frame.

9. An operation method of an access point (AP) in a wireless local area network (WLAN), the operation method comprising:

receiving, from a first station (STA), information indicating a first transition time, the first STA including a transceiver and a receiver, and the first transition time being a time required for the transceiver of the first STA to transit from a doze state to an awake state after a reception of a wake-up radio (WUR) wake-up frame;

receiving, from a second STA, information indicating a second transition time, the second STA including a transceiver and a receiver, and the second transition time being a time required for the transceiver of the second STA to transit from the doze state to the awake state after a reception of the WUR wake-up frame;

transmitting the WUR wake-up frame requesting that a plurality of STAs including the first and second STAs operate in a normal mode; and transmitting, to the plurality of STAs, a first frame for soliciting multi-user (MU) transmissions, the first frame being transmitted after an expiration of a longest transition time among transition times of the plurality of STAs.

10. The operation method of claim 9, wherein the WUR wake-up frame is transmitted based on a broadcast scheme or a multicast scheme.

11. The operation method of claim 9, wherein the first frame is a trigger frame used for triggering the MU transmissions.

12. The operation method of claim 9, wherein the first frame includes information on a first resource unit (RU) allocated for transmission of a first response frame by the first STA and information on a second RU allocated for transmission of a second response frame by the second STA, and the first RU and the second RU are multiplexed in a frequency domain.

13. The operation method of claim 12, wherein the first RU is mapped to an identifier of the first STA, and the second RU is mapped to an identifier of the second ST.

14. The operation method of claim 12, wherein a first data frame for the first STA among a plurality of data frames is transmitted using the first RU, and a second data frame for the second STA among the plurality of data frames is transmitted using the second RU.

15. The operation method of claim 9, further comprising receiving a first response frame in response to the first frame from the first STA and receiving a second response frame in response to the first frame from the second STA,
wherein a plurality of data frames are transmitted to the plurality of STAs after receiving the first and second response frames.

16. An operation method of a first station (STA) in a wireless local area network (WLAN), the first STA comprising a primary connectivity radio (PCR) and a wake-up receiver (WURx), and the operation method comprises:

transmitting, by the PCR of the first STA, a first frame including information indicating a first transition time, and the first transition time being a time required for the PCR of the first STA to transit from a doze state to an awake state after a reception of a wake-up radio (WUR) wake-up frame;

receiving, by the WURx of the first STA, a wake-up radio (WUR) wake-up frame from an access point (AP);

transitioning an operation state of the PCR of the first STA from a doze state to an awake state after receiving the WUR wake-up frame;

receiving, by the PCR of the first STA, a second frame for soliciting a plurality of STAs' transmissions from the AP; and receiving, by the PCR of the first STA, a first data frame from the AP,
wherein duration between the reception of the WUR wake-up frame and the reception of the second frame is longer than or equal to duration between the first transition time and a longest transition time among transition times of the solicited plurality of STAs.

17. The operation method of claim 16, wherein the WUR wake-up frame is a dedicated WUR wake-up frame which is transmitted to only the first STA or a common WUR wake-up frame which is transmitted to the solicited plurality of STAs.

18. The operation method of claim 16, wherein the second frame includes information on a first resource unit (RU) allocated for transmission of a first response frame by the first STA and information on a second RU allocated for transmission of a second response frame by a second STA, and the first RU and the second RU are multiplexed in a frequency domain.

19. The operation method of claim 18, wherein the first RU is mapped to an identifier of the first STA, the second RU is mapped to an identifier of the second STA, the first data frame for the first STA is received using the first RU, and a second data frame for the second STA is received using the second RU.

20. The operation method of claim 16, further comprising transmitting, by the PCR of the first STA, a first response frame in response to the trigger frame to the AP, wherein the first data frame is received after transmitting the first response frame.

\* \* \* \* \*